US011865055B2

(12) United States Patent
Mulhern et al.

(10) Patent No.: US 11,865,055 B2
(45) Date of Patent: Jan. 9, 2024

(54) SEAT POSITIONING SYSTEM FOR A WHEELCHAIR

(71) Applicant: Pride Mobility Products Corporation, Exeter, PA (US)

(72) Inventors: James Mulhern, Nanticoke, PA (US); Stephen J. Antonishak, Nanticoke, PA (US)

(73) Assignee: PRIDE MOBILITY PRODUCTS CORPORATION, Duryea, PA (US)

( * ) Notice: Subject to any disclaimer, the term of this patent is extended or adjusted under 35 U.S.C. 154(b) by 0 days.

(21) Appl. No.: 17/526,879

(22) Filed: Nov. 15, 2021

(65) Prior Publication Data

US 2022/0071820 A1 Mar. 10, 2022

Related U.S. Application Data

(63) Continuation of application No. 16/091,877, filed as application No. PCT/US2017/026175 on Apr. 5, 2017, now Pat. No. 11,173,081.

(Continued)

(51) Int. Cl.

*A61G 5/10* (2006.01)
*A47C 1/024* (2006.01)

(Continued)

(52) U.S. Cl.

CPC ............ *A61G 5/1067* (2013.01); *A47C 1/023* (2013.01); *A47C 1/024* (2013.01); *A47C 1/028* (2013.01);

(Continued)

(58) Field of Classification Search

None

See application file for complete search history.

(56) References Cited

U.S. PATENT DOCUMENTS 3,763,789 A * 10/1973 Olson, Sr. ............... B60F 1/005 105/72.2
4,045,081 A * 8/1977 Ueno ..................... A47C 1/032 297/354.12

(Continued)

FOREIGN PATENT DOCUMENTS

CA 2906599 9/2014
CN 2035195 4/1989

(Continued)

OTHER PUBLICATIONS

Supplementary Partial European Search Report for EP 17779759; dated Mar. 17, 2020; 3 pages.

(Continued)

*Primary Examiner* — David E Allred

(74) *Attorney, Agent, or Firm* — Morgan, Lewis & Bockius LLP

(57) ABSTRACT

A seat positioning system includes a base frame having a pair of forward slots and a pair of rear slots, and a seat frame having a front end and a back end. The seat frame is coupled to the base frame and movable relative to the base frame. A first pair of linkages is slideably coupled to the pair of forward slots and connects the frames. A first pair of locking devices has a locked configuration adapted to prevent the first pair of linkages from sliding relative to the pair of forward slots and an unlocked configuration adapted to allow the first pair of linkages to slide relative to the pair of forward slots. A second pair of linkages slideably is coupled to the pair of rear slots and connects the frames. An actuator is pivotally connected to both the seat frame and the base frame and is configured to extend and contract to move the seat frame relative to the base frame.

15 Claims, 22 Drawing Sheets

Related U.S. Application Data

(60) Provisional application No. 62/318,344, filed on Apr. 5, 2016.

(51) Int. Cl.

| | |
|---|---|
| ***A61G 15/02*** | (2006.01) |
| ***A61G 15/00*** | (2006.01) |
| ***A47C 1/023*** | (2006.01) |
| ***A47C 1/028*** | (2006.01) |
| ***A47C 1/032*** | (2006.01) |
| ***A47C 1/035*** | (2006.01) |
| ***A47C 1/037*** | (2006.01) |

(52) U.S. Cl.

CPC .............. *A47C 1/032* (2013.01); *A47C 1/035* (2013.01); *A47C 1/037* (2013.01); *A61G 5/107* (2013.01); *A61G 5/1059* (2013.01); *A61G 5/1075* (2013.01); *A61G 15/00* (2013.01); *A61G 15/02* (2013.01)

(56) References Cited

U.S. PATENT DOCUMENTS

| | | | | | |
|---|---|---|---|---|---|
| 4,865,214 | A * | 9/1989 | Koda | B65F 1/163 220/263 |
| 5,613,662 | A | 3/1997 | Blackmore | |
| 6,123,376 | A * | 9/2000 | Yakushinji | B66C 1/422 294/110.1 |
| 2005/0046129 | A1 | 3/2005 | Antonishak et al. | |
| 2005/0121959 | A1 | 6/2005 | Kruse et al. | |
| 2007/0045991 | A1 | 3/2007 | Perk | |
| 2013/0175847 | A1* | 7/2013 | Lawson | A61G 5/14 297/85 M |
| 2014/0033433 | A1* | 2/2014 | Kimishima | A61B 5/055 5/601 |
| 2014/0262566 | A1 | 9/2014 | Davis et al. | |
| 2014/0327351 | A1* | 11/2014 | Chung | A47B 88/463 312/333 |
| 2014/0361592 | A1* | 12/2014 | Kuno | B60N 2/1825 297/325 |
| 2016/0151230 | A1* | 6/2016 | Bagheri | A61H 3/008 280/87.041 |

FOREIGN PATENT DOCUMENTS

| | | | |
|---|---|---|---|
| CN | 1911200 | | 2/2007 |
| CN | 101641035 | | 9/2009 |
| CN | 201453539 | | 5/2010 |
| CN | 201912346 | | 8/2011 |
| CN | 102424065 | | 4/2012 |
| CN | 103661011 | | 3/2014 |
| CN | 204712917 | | 10/2015 |
| DE | 202013002877 | U1 | 5/2013 |
| EP | 1506760 | A1 | 2/2005 |
| GB | 2118031 | A | 10/1983 |
| WO | 2017176902 | A1 | 10/2017 |

OTHER PUBLICATIONS

European Search Opinion for U.S. Appl. No. 17/779,759; dated Mar. 17, 2020: 3 pages.

European Search Strategy for EP 17779759; dated Mar. 17, 2020; 1 page.

Search Report for Chinese Application No. 201780034047.1; dated Oct. 18, 2019: 1 page.

Chinese Supplementary Search Report for CN 201780034047.1; dated Mar. 5, 2020; 2 pages.

1 Canadian Office Action for Canadian Application No. 3,018,873, dated Apr. 1, 2020 (4 pages).

Chinese Office Action for Chinese Patent Application No. 201780034047.1 dated Oct. 28, 2019, 6 pages.

Australian Examination Report No. 1 dated Jan. 16, 2019 for Australian Patent Application No. 2017246905, 3 pages.

Canadian Office Action dated Jul. 19, 2019 for Canadian Patent Application No. 3,018,873, 5 pages.

International Search Report and Written Opinion of the International Searching Authority, dated Jul. 3, 2017, for International Patent Application No. PCT/US2017/026175.

Decision on Rejection, dated Jan. 14, 2023, for the corresponding Chinese Patent Application No. 202010477201.6, 6 pages.

European Office Action dated Mar. 13, 2023 for corresponding European Patent Application No. 17779759.4, 2 Pages.

Office Action for corresponding Chinese Application No. 202010477201.6 dated Mar. 8, 2022, 21 pages.

* cited by examiner

SEAT POSITIONING SYSTEM FOR A WHEELCHAIR

CROSS-REFERENCE TO RELATED APPLICATIONS

This application is a continuation of U.S. patent application Ser. No. 16/091,877, filed on Oct. 5, 2018, which is a U.S. National Stage of International Patent Application No.: PCT/US2017/026175, filed on Apr. 5, 2017, which claims the benefit of U.S. Provisional Patent Application No. 62/318,344, filed Apr. 5, 2016, all of which are incorporated by reference in their entireties.

FIELD OF THE INVENTION

The present invention generally relates to a seat positioning system. More particularly, in some embodiments the present invention relates to a seat positioning system for a wheelchair.

BRIEF DESCRIPTION OF THE DRAWINGS

The following detailed description of the invention will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein.

DETAILED DESCRIPTION

The present subject matter will now be described more fully hereinafter with reference to the accompanying Figures, in which representative embodiments are shown. The present subject matter can, however, be embodied in different forms and should not be construed as limited to the embodiments set forth herein. Rather, these embodiments are provided to describe and enable one of skill in the art. All publications, patent applications, patents, and other references mentioned herein are incorporated by reference in their entirety.

Figure 1:
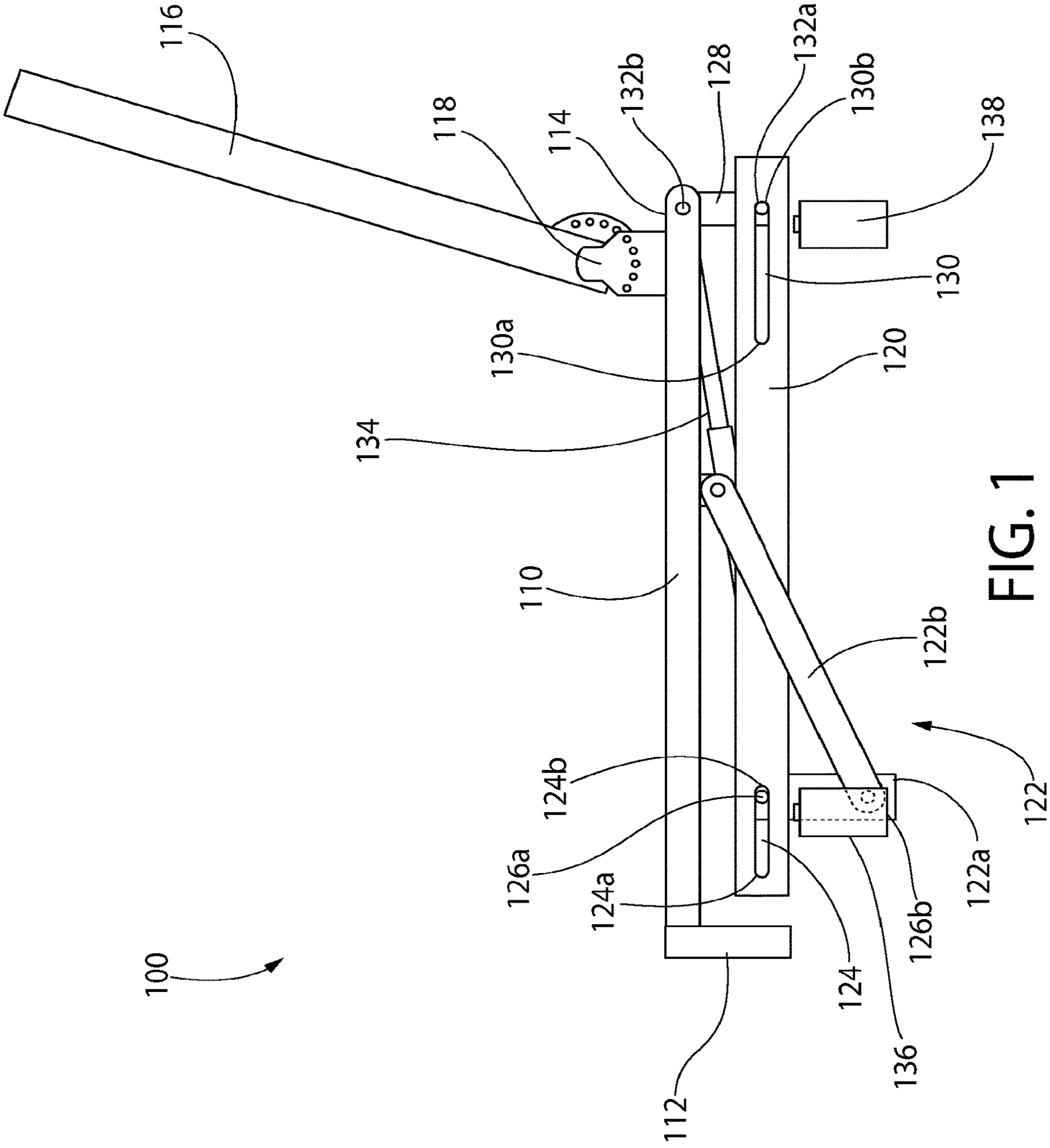
FIG. 1 shows a left side view of a seat positioning system in accordance with a first embodiment of the present invention.
Figure 2A:
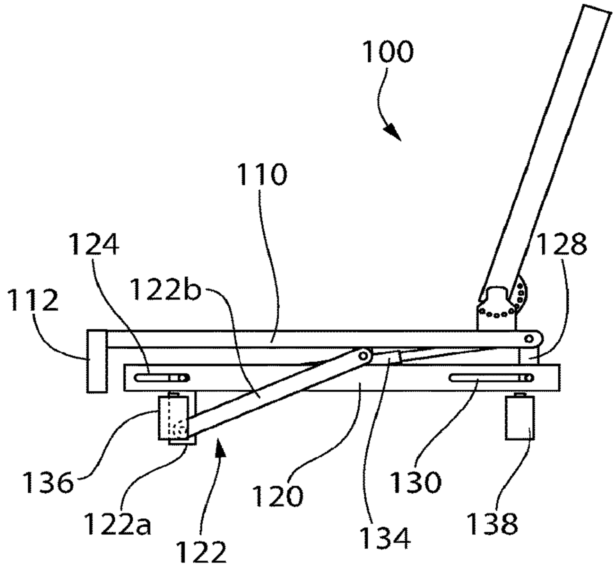
FIGS. 2A-2C show the seat positioning system of FIG. 1 moving in a forward horizontal direction.
Figure 2B:
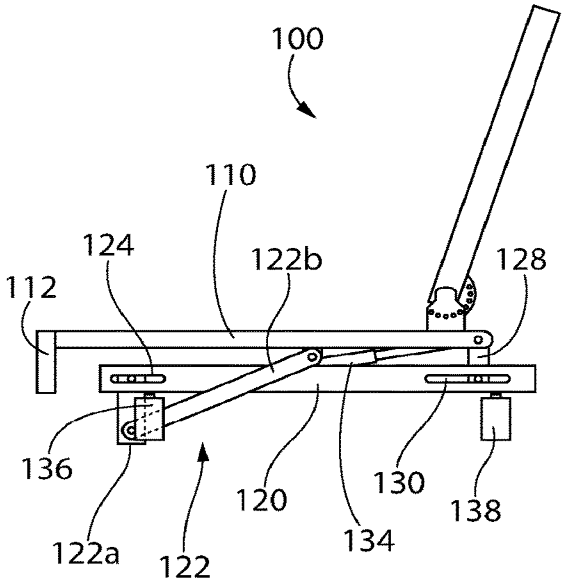
Figure 2C:
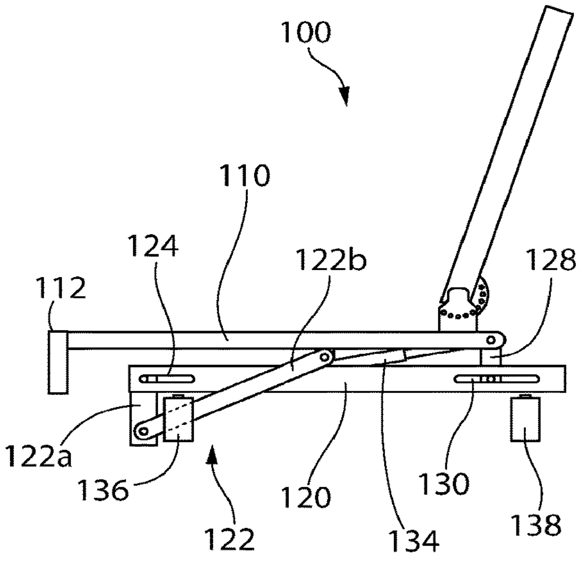
Figure 2D:
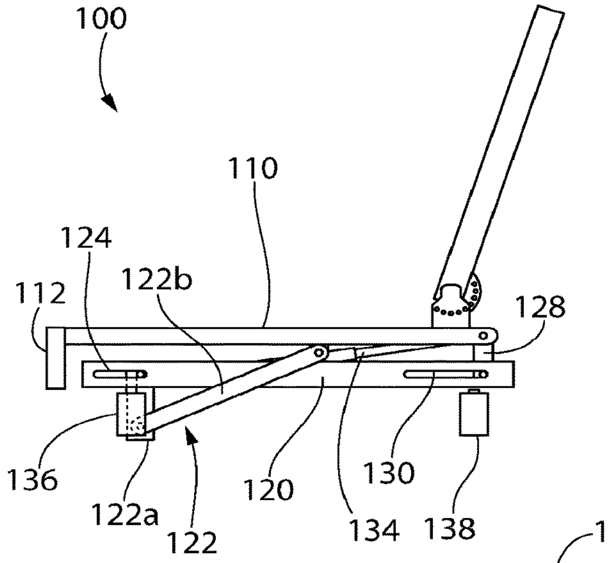
FIGS. 2D-2F show the seat positioning system of FIG. 1 tilting in a backward direction.
Figure 2E:
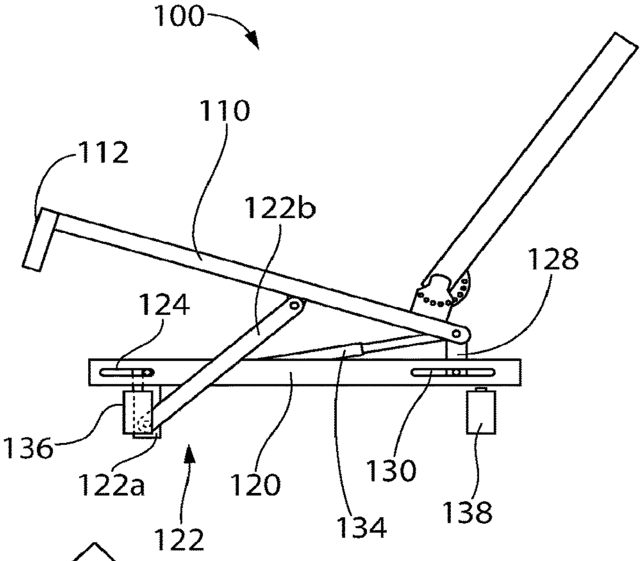
Figure 2F:
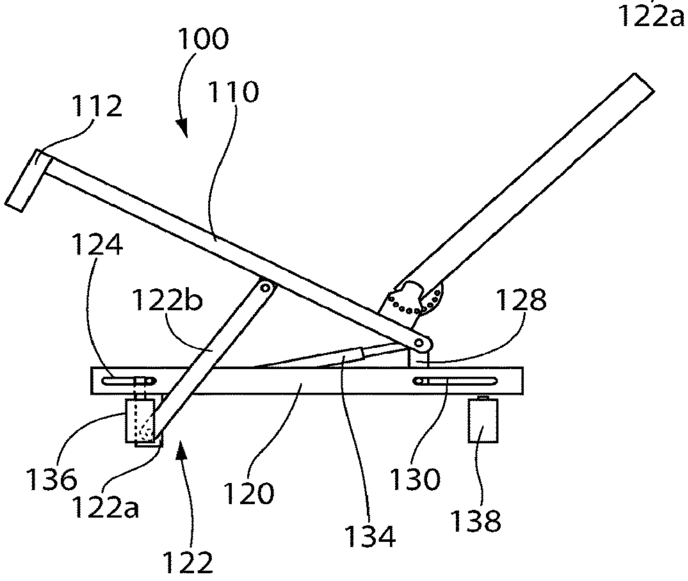

Referring to the drawings in detail, wherein like reference numerals indicate like elements throughout, there is shown in FIGS. 1-2F, generally designated 100, a seat positioning system in accordance with a first embodiment of the present invention. Seat positioning system 100 in some embodiments includes a seat frame 110 having a forward end 112 and a back end 114. In some embodiments, seat frame 110 is configured to support a seat that can be used, for example, on a motorized wheelchair. Example wheelchairs for which embodiments of the presently described seat positioning systems 100 (including seat positioning systems 200, 500, 600 and 700 described below) may be used are disclosed in U.S. Patent Application Publication No. US 2015/0196438 A1, entitled "Elevated Height Wheelchair," which is incorporated herein by reference in its entirety. Embodiments of seat positioning systems 100, 200, 500, 600, 700 may also be used on other wheelchair configurations known in the art.

In further embodiments, a back support 116 configured to support a seat back is connected to seat frame 110 proximate back end 114. In some embodiments, back support 116 may be connected to seat frame 110 with an adjustable angle connector 118 which permits back support 116 to pivot relative to seat frame 110 through a range of predetermined angles.

In some embodiments, seat frame 110 is coupled to a base frame 120 which may be generally situated below seat frame 110. Base frame 120, in some embodiments, may be further fixed to a wheelchair chassis. Seat frame 110, in some embodiments, is movably coupled to base frame 120 such that seat frame 110 is capable of moving relative to base frame 120 in at least one of forward-backward motion, up-down motion, or tilting as will be explained further below. In some embodiments, one or more wheels or rollers (not shown) may be provided between seat frame 110 and base frame 120 which may be configured to facilitate relative motion between seat frame 110 and base frame 120. The wheels or rollers may be attached underneath seat frame 110 proximate forward end 112 according to some embodiments and configured to roll against a top surface of base frame 120 during relative motion between seat frame 110 and base frame 120.

In some embodiments, seat frame 110 is coupled to base frame 120 using one or more linkages. In some embodiments, seat frame 110 is coupled to base frame 120 using one or more pairs of linkages. In some embodiments, seat frame 110 is coupled to base frame 120 using a pair of first linkages 122 which are arranged on the left and right sides of base frame 120. In some embodiments, seat frame 110 is coupled to base frame 120 using a pair of second linkages 128 which are arranged on the left and right sides of base frame 120. For simplicity, only the left members of the pairs of linkages are shown in the side views presented in FIGS. 1-2F, however, it should be understood that the right members of the pairs of linkages can be symmetrically arranged on the right side of seat positioning system 100.

In some embodiments, each of first linkages 122 includes a first end slideably coupled to the base frame 120 and a second end connected to seat frame 110. In some embodiments, each of first linkages 122 may include a first member 122*a* and a second member 122*b* which are pivotally coupled with each other. First member 122*a*, in some embodiments, includes a first end coupled to base frame 120 and a second end pivotally coupled to second member 122*b*. In some embodiments, first member 122*a* is slidably coupled with base frame 120 such that first member 122*a* is capable of sliding in a forward-backward direction along a portion of base frame 120. In some embodiments, first member 122*a* is not configured to pivot relative to base frame 120. In some embodiments, base frame 120 includes a forward slot 124 arranged on each of the left and right sides of base frame 120 to which first member 122*a* is coupled. In some embodiments, first member 122*a* includes a pin 126*a* which is received within forward slot 124 and configured to slide within forward slot 124 between a front end 124*a* and a back end 124*b* of forward slot 124. Pin 126*a* may be configured as or further includes a rod, block, bolt, wheel, roller, ball bearing, or other sliding element that is capable of sliding along forward slots 124.

In further embodiments, seat positioning system 100 includes forward locking devices 136 which are capable of limiting or stopping the sliding of first linkages 122 relative to forward slots 124. In some embodiments, forward locking devices 136 are configured to limit or stop the sliding of first member 122*a* relative to forward slots 124. In some embodiments, forward locking devices 136 include a locked configuration which prevents first member 122*a* from sliding relative to forward slots 124 and an unlocked configuration which permits first member 122*a* to slide relative to forward slots 124. In some embodiments, forward locking devices 136 each include a plunger which, in the locked configuration, is extended to physically block pin 126*a* from sliding within forward slots 124. In the unlocked configuration, the plunger is retracted such that pin 126*a* is cleared to slide within forward slots 124. In some embodiments, the plunger is a solenoid-actuated plunger, such as a tubular linear solenoid. One non-limiting example of a tubular linear solenoid that may be suitable for use in forward locking devices 136 is the LEDEX® Size 100M STA® Push Tubular Solenoids—26 mm diameter×52 mm (Part Number: 195227-XXX).

Figure 5:
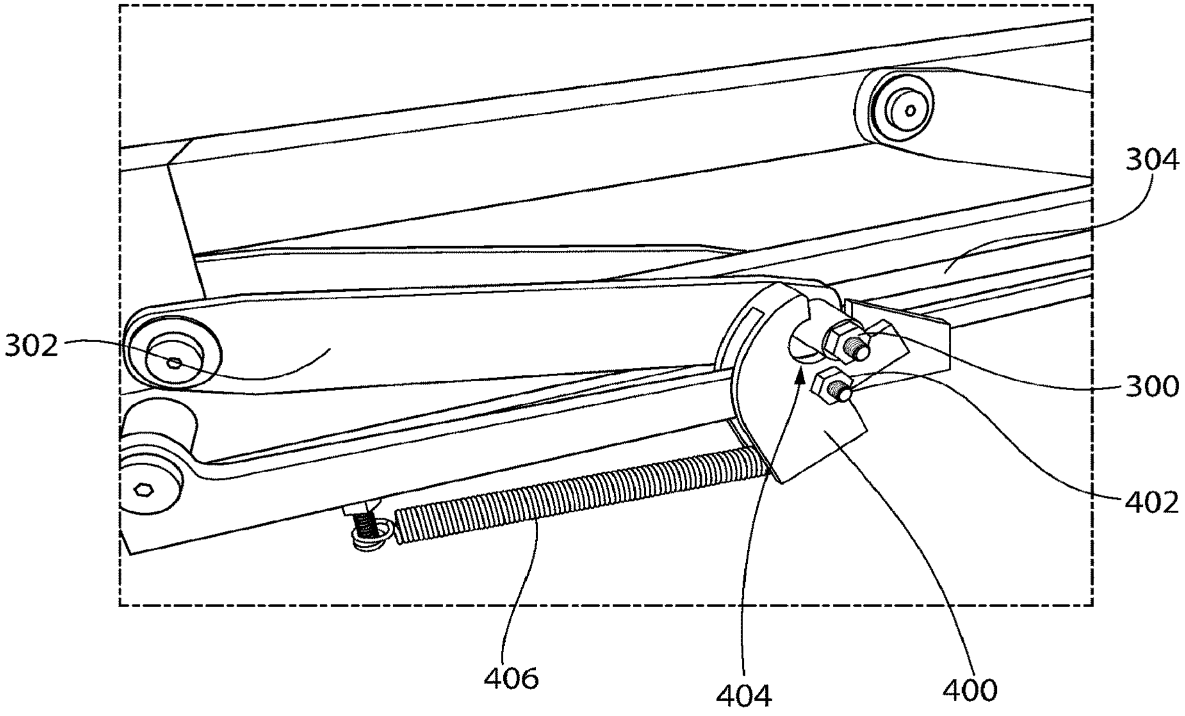
FIG. 5 shows a locking device in accordance with an embodiment of the present invention.

In other embodiments, each forward locking device 136 includes a catch which is configured to pivot in a first direction to prevent movement of first linkage 122 relative to forward slots 124 in a locked configuration, and pivot in a second direction to allow movement of the first linkage 122 relative to forward slots 124 in an unlocked configuration. An example of a catch that may be used for forward locking device 136 is shown in FIG. 5, which depicts catch 400 configured to engage with a pin 300 on linkage 302 in order to allow or prevent linkage 302 from sliding with respect to slot 304. Linkage 302 may, for example, represent first linkage 122 and pin 300 may represent pin 126*a*. In some embodiments, catch 400 is configured to pivot about an axis 402 between a locked configuration and an unlocked configuration. In some embodiments, catch 400 is configured to pivot about axis 402 in a first direction (e.g., clockwise in the view shown in FIG. 5) until pin 300 is received within a notch 404 in the locked configuration. In the locked configuration, pin 300 is physically blocked from sliding within slot 304 by catch 400 such that linkage 302 is prevented from sliding relative to slot 304. In some embodiments, catch 400 may include one or more biasing elements 406 (e.g., springs) which are configured to bias catch 400 towards the locked configuration. In further embodiments, catch 400 is configured to pivot about axis 402 in a second direction (e.g., counterclockwise in the view shown in FIG. 5) towards an unlocked configuration where pin 300 is cleared to slide within slot 304. In some embodiments, pivoting of catch 400 towards the unlocked configuration may be caused by an actuator which is controlled by a control system (not shown).

Second member 122*b* in some embodiments includes a first end which is pivotally coupled to the second end of first member 122*a*. In some embodiments, first end of second member 122*b* is coupled to second end of first member 122*a* by a pivot pin 126*b* which allows for second member 122*b* to pivot relative to first member 122*a*. In some embodiments, second member 122*b* includes a second end which is pivotally coupled to seat frame 110. In some embodiments, the second end of second member 122*b* is coupled to seat frame 110 at a location between front end 112 and back end 114 by a pivot pin 126*c* which allows for second member 122*b* to pivot relative to seat frame 110.

Figure 6:
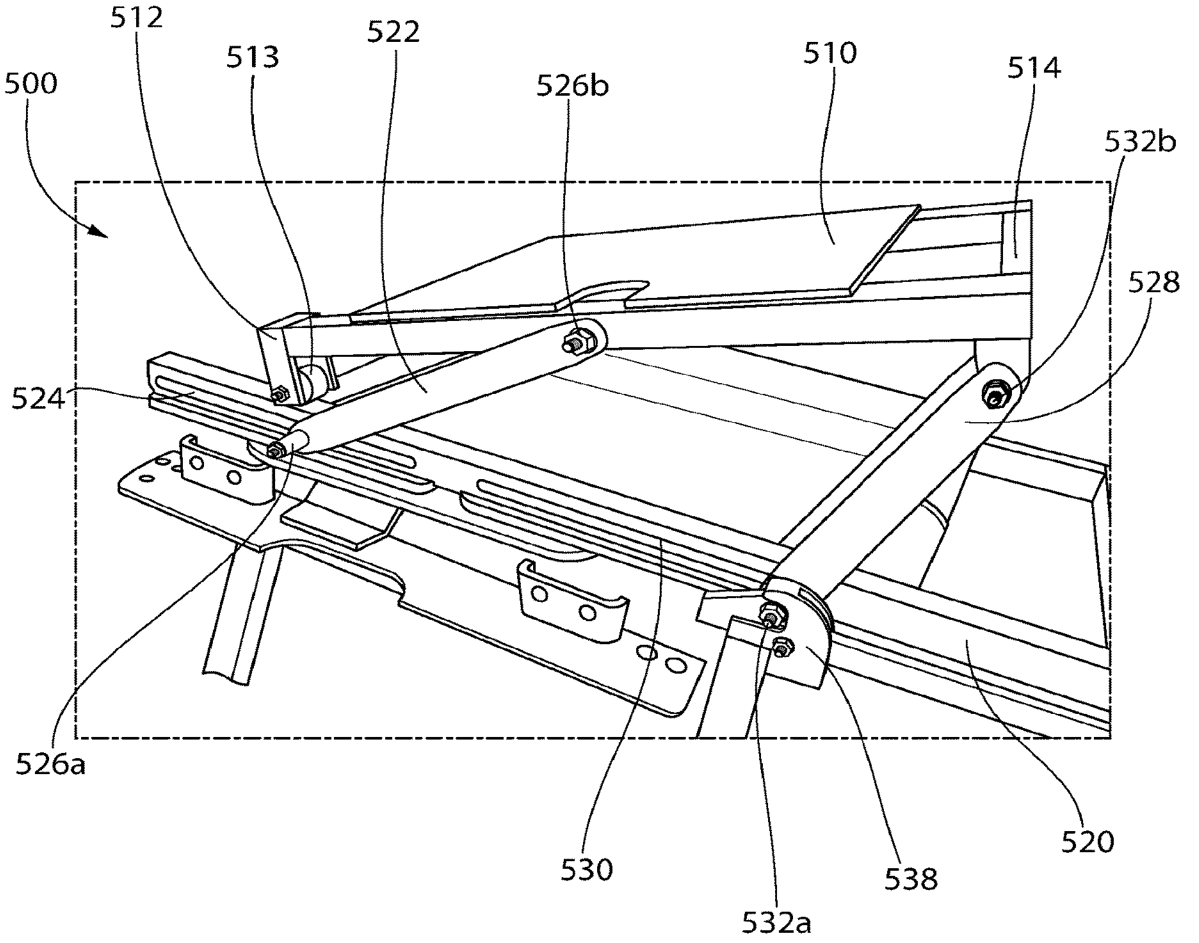
FIG. 6 shows an example seat positioning system in accordance with one embodiment of the present invention.

In some embodiments, first members 122*a* of first linkages 122 need not be present. According to these embodiments, the first end of second members 122*b* may be coupled directly with forward slots 124 by pin 126*a* and be configured to slide within forward slots 124 and pivot relative to base frame 120. FIG. 6 described further below illustrates an example having such a configuration. In some such embodiments, forward locking devices 136 may be configured to allow or prevent second members 122*b* from sliding within forward slots 124 in the unlocked and locked configurations in a manner similar to that described above.

In some embodiments, each of second linkages 128 includes a single member having ends that may be pivotally coupled with base frame 120 and seat frame 110. In some embodiments, each of second linkages 128 includes a first end which is slideably coupled with base frame 120 such that each of second linkages 128 is capable of sliding in a forward-backward along a portion of base frame 120. In some embodiments, base frame 120 includes a rear slot 130 arranged on each of the left and right sides of base frame 120 to which second linkages 128 are coupled. In some embodiments, each of second linkages 128 includes a pin 132*a* which is received within rear slot 130 and configured to slide within rear slot 130 between a front end 130*a* and a back end 130*b* of rear slot 130. Pin 132*a* may be configured as or further includes a rod, block, bolt, wheel, roller, ball bearing, or other sliding element that is capable of sliding along rear slots 130. Each of second linkages 128 may further be provided with a further pin 132*b* which connects second ends of second linkages with seat frame 110.

In further embodiments, seat positioning system 100 includes rear locking devices 138 which are capable of limiting or stopping the sliding of second linkages 128 relative to rear slots 130. In some embodiments, rear locking devices 138 includes a locked configuration which prevents second linkages 128 from sliding relative to rear slots 130 and an unlocked configuration which permits second linkages 128 to slide relative to rear slots 124. In some embodiments, rear locking devices 138 includes a plunger which, in the locked configuration, is extended to physically block pin 132*a* from sliding within rear slots 130. In the unlocked configuration, the plunger is retracted such that pin 132*a* is cleared to slide within rear slots 130. In some embodiments, the plunger is a solenoid-actuated plunger, such as a tubular linear solenoid. One non-limiting example of a tubular linear solenoid that may be suitable for use in rear locking devices 138 is the LEDEX® Size 100M STA® Push Tubular Solenoids—26 mm diameter×52 mm (Part Number: 195227-XXX). In other embodiments, each rear locking device 138 is configured as a catch, for example, catch 400 described above with reference to FIG. 5.

Seat positioning system 100, in some embodiments, also includes one or more actuators which are configured to move seat frame 110 relative to base frame 120. In some embodiments, seat positioning system 100 includes only a single actuator configured to move seat frame 110 relative to base frame 120. In other embodiments, seat positioning system 100 includes more than one actuator which are arranged in parallel. As shown in FIGS. 1-2F, seat positioning system 100 includes an actuator 134 positioned generally below seat frame 110. In some embodiments, actuator 134 is a linear actuator which is configured to extend or contract along a single axis. In some embodiments, actuator 134 is one of a mechanical linear actuator, a hydraulic linear actuator, or a pneumatic linear actuator. In some embodiments, actuator 134 includes a telescoping body (e.g., piston-cylinder, screw-type actuator, etc.). Actuator 134 in some embodiments includes a first end that is pivotally connected to seat frame 110 and a second end that is pivotally connected to base frame 120. The first end of actuator 134 may be connected to seat frame 110 at a location at or proximate to back end 114.

In certain embodiments, activation of actuator 134 will cause seat frame 110 to move relative to base frame 120, which will be explained with particular reference to FIGS. 2A-2F. FIGS. 2A-2C show the forward movement of seat frame 110 relative to base frame 120 according to some embodiments of the present invention. In these embodiments, each of forward locking devices 136 and rear locking devices 138 are in an unlocked configuration which allows first linkages 122 and second linkages 128 to respectively slide within forward slots 124 and rear slots 130 along a forward-backward direction (left-right in the page of the figures). As shown in FIG. 2A, actuator 134 is in an extended state, pin 126*a* is positioned at back end 124*b* of forward slot 124, and pin 132*a* is positioned at back end 130*b* of rear slot 130. As actuator 134 contracts, as shown in FIGS. 2B and 2C, seat frame 110 slides forward (i.e., towards the left of the page of the figures) relative to seat frame 120 such that front end 112 of seat frame 110 extends further away from base frame 120. In some embodiments, seat frame 110 does not tilt and/or raise/lower with respect to base frame 120 during the forward movement. Meanwhile first linkages 122 slides towards front end 124*a* of forward slot 124 and second linkages 128 slides towards front end 130*a* of rear slot 130. Extending actuator 134 starting from the position shown in FIG. 2C would cause the reverse movement such that seat frame 110 moves backward (i.e., towards the right of the page of the figures) relative to seat frame 120 towards the original position shown in FIG. 2A.

FIGS. 2D-2F show the backward tilting movement of seat frame 110 relative to base frame 120 according to some embodiments of the present invention. In these embodiments, forward locking devices 136 are in a locked configuration such that first linkages 122 are prevented from sliding with forward slots 124 while rear locking devices 138 are in an unlocked configuration such that second linkages 128 are permitted to slide within rear slots 130. As actuator 134 contracts as shown in FIGS. 2E and 2F, second linkages 128 slides forward towards front end 130*a* of rear slots 130. However, since forward locking device 136 prevents first linkages 122 from sliding within forward slots 124, second members 122*b* of first linkages 122 pivots relative to base frame 120 causing seat frame 110 to tilt backwards relative to base frame 120 such that forward end 112 is raised higher than back end 114. Extension of actuator 134 from the position shown in FIG. 2F would cause the reverse movement such that seat frame 110 moves towards the original position shown in FIG. 2D.

Figure 3:
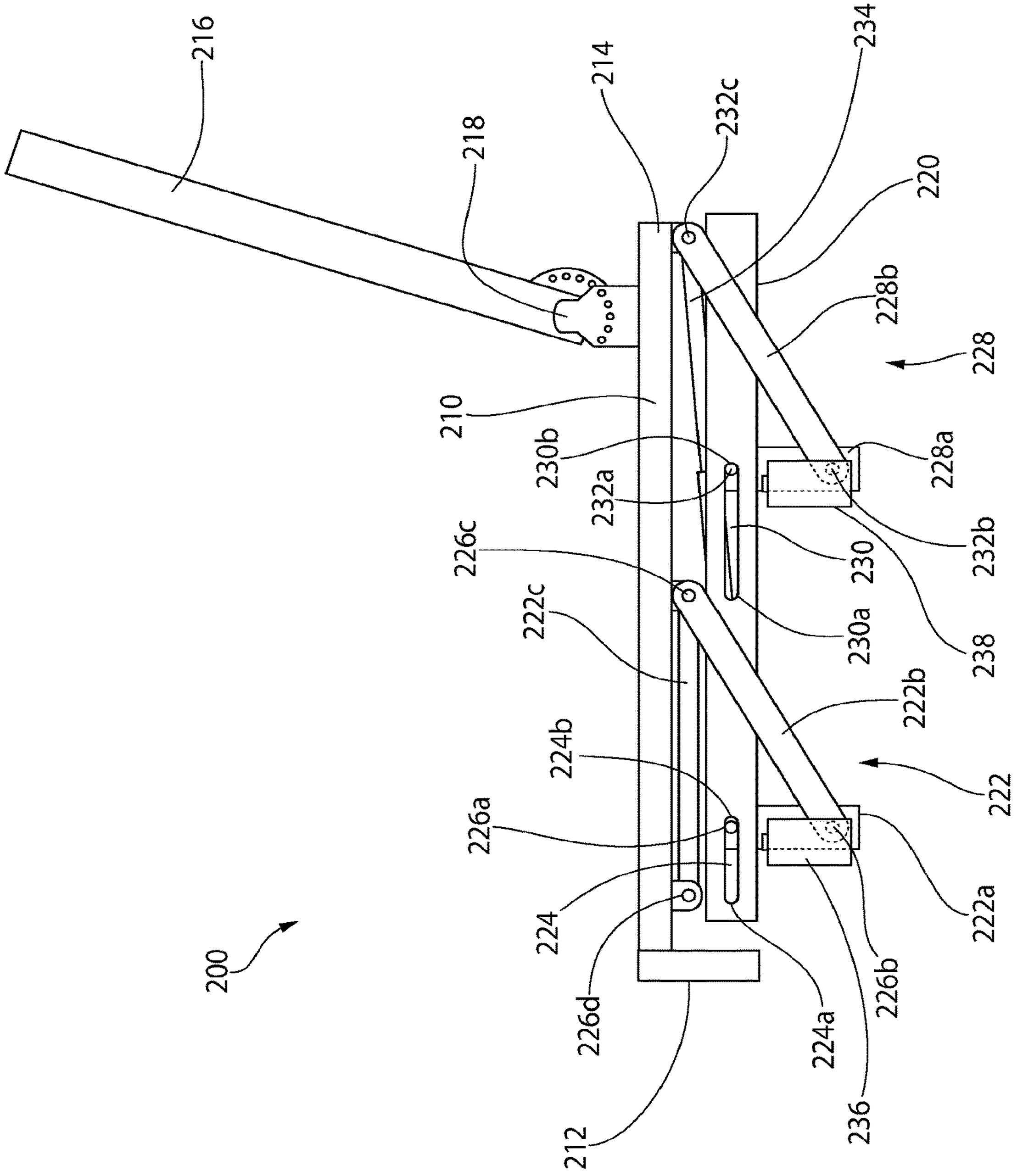
FIG. 3 shows a left side view of a seat positioning system in accordance with a second embodiment of the present invention.
Figure 4A:
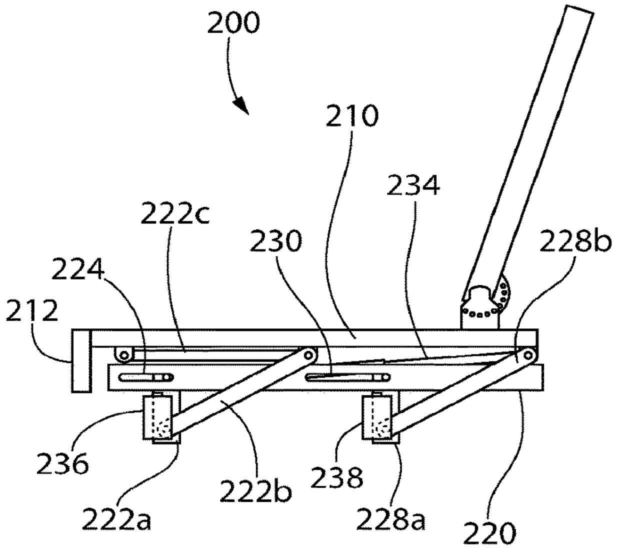
FIGS. 4A-4C show the seat positioning system of FIG. 3 moving in a forward horizontal direction.
Figure 4B:
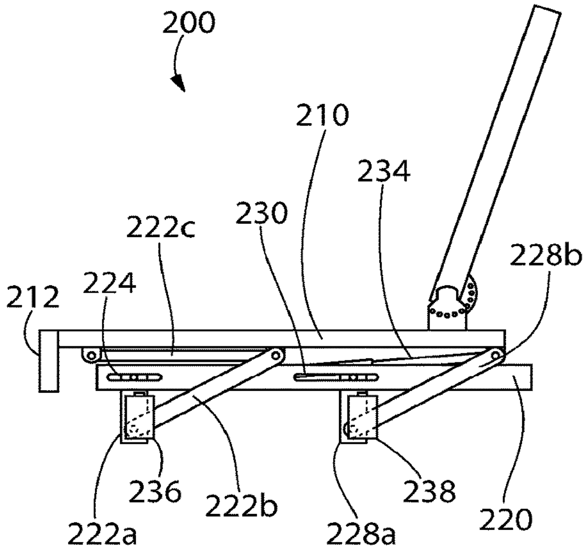
Figure 4C:
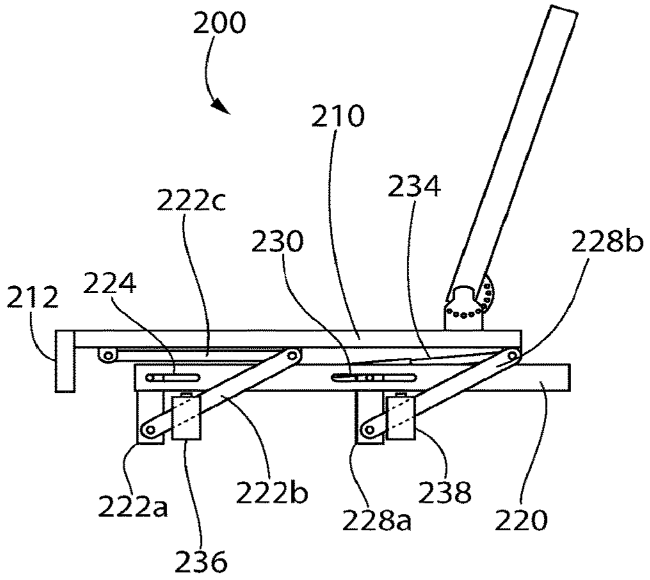
Figure 4D:
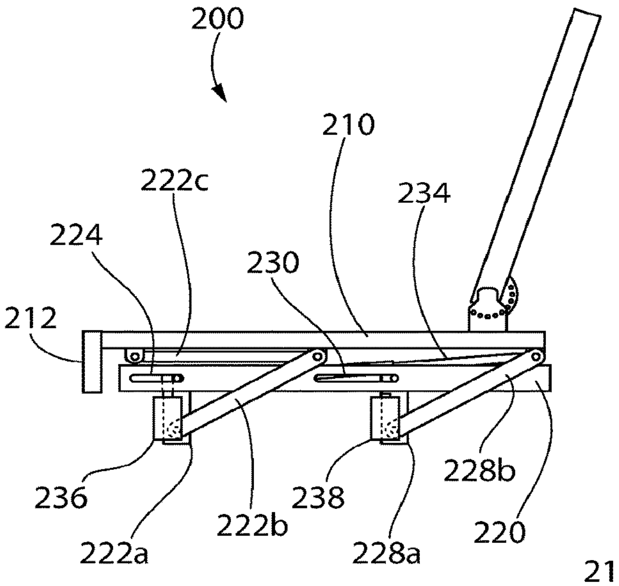
FIGS. 4D-4F show the seat positioning system of FIG. 3 tilting in a backward direction.
Figure 4E:
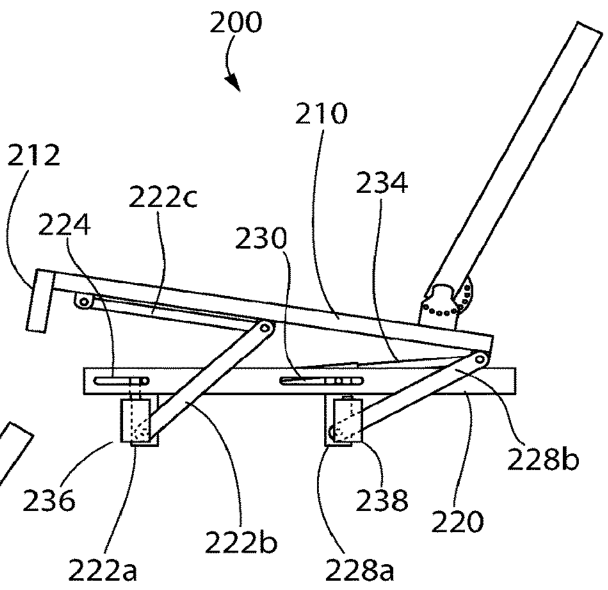
Figure 4F:
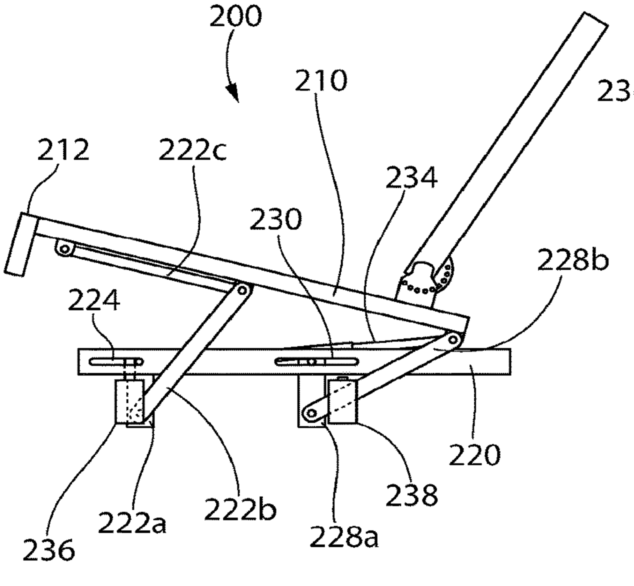
Figure 4G:
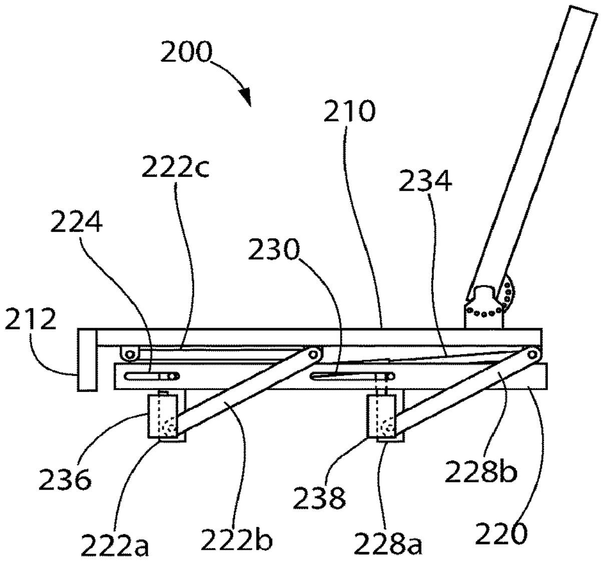
FIGS. 4G-4I show the seat positioning system of FIG. 3 tilting in a forward direction.
Figure 4H:
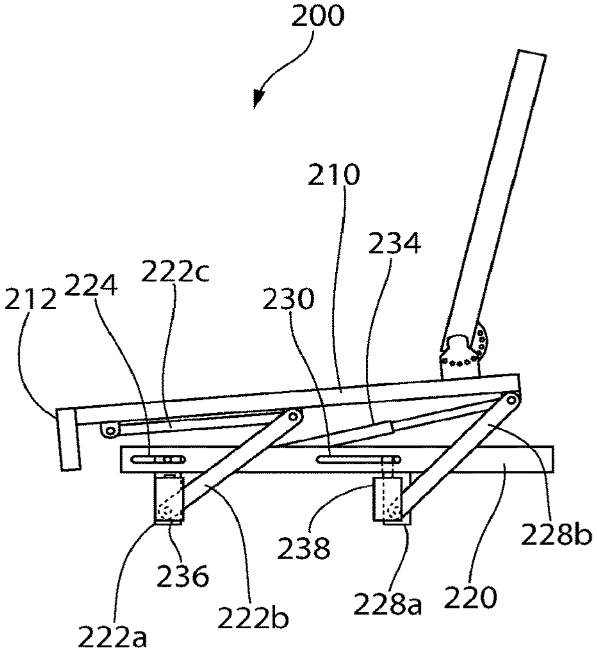
Figure 4I:
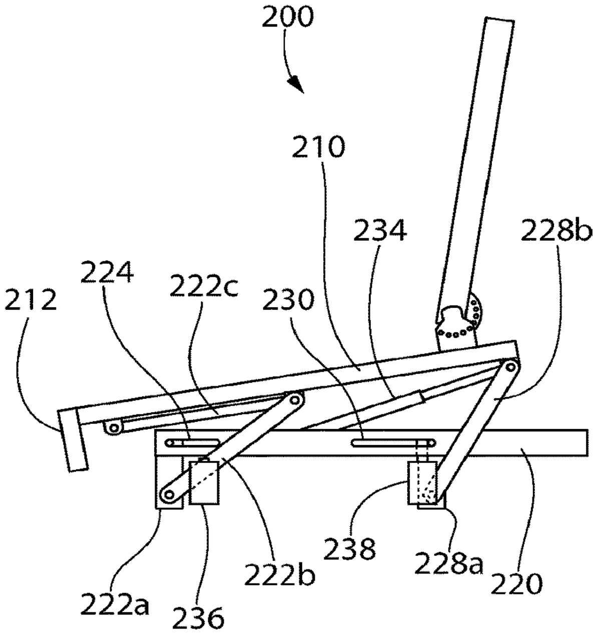
Figure 4J:
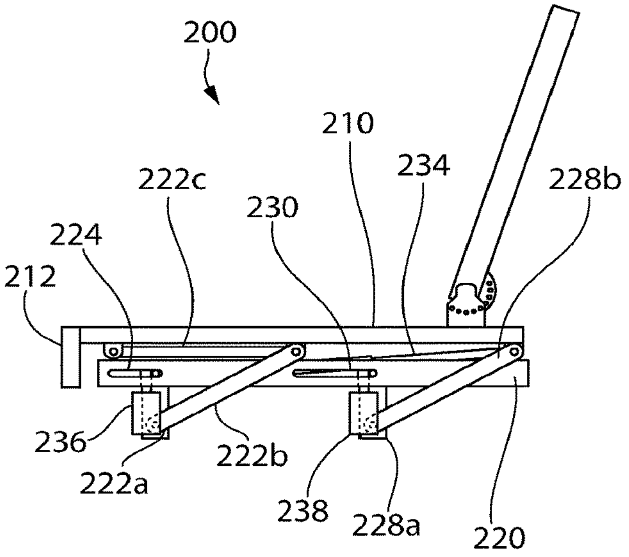
FIGS. 4J-4L show the seat positioning system of FIG. 3 moving in an upward vertical direction.
Figure 4K:
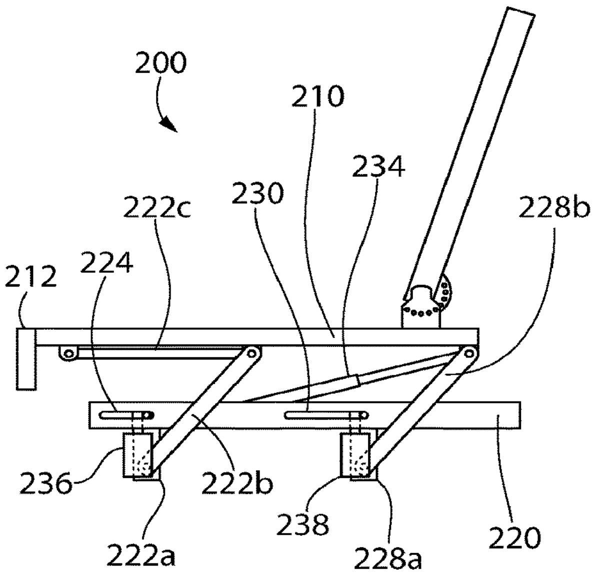
Figure 4L:
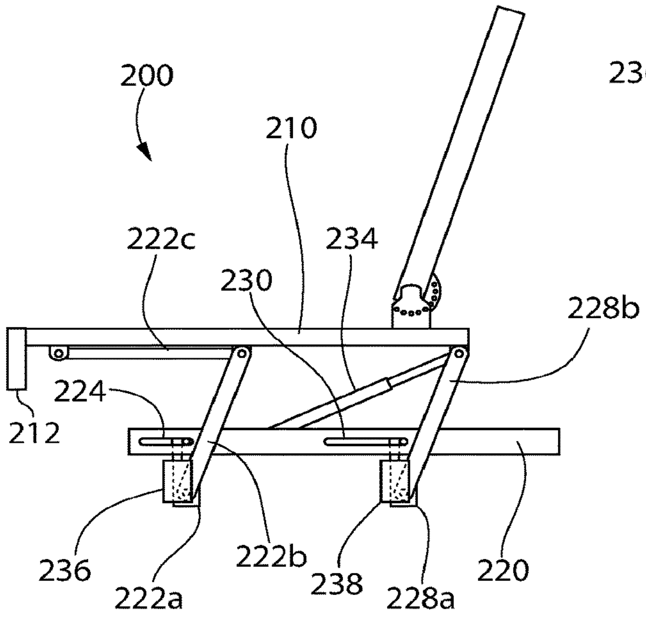

With reference now to FIGS. 3-4L, there is shown a seat positioning system in accordance with a second embodiment of the present invention, generally designated 200. Seat positioning system 200 in some embodiments includes a seat frame 210 having a forward end 212 and a back end 214. In some embodiments, seat frame 210 is configured to support a seat that can be used, for example, on a motorized wheelchair. In further embodiments, a back support 216 configured to support a seat back is connected to seat frame 210 proximate back end 214. In some embodiments, back support 216 may be connected to seat frame 210 with an adjustable angle connector 218 which permits back support 216 to pivot relative to seat frame 210 through a range of predetermined angles.

In some embodiments, seat frame 210 is coupled to a base frame 220 which may be generally situated below seat frame 210. Base frame 220, in some embodiments, may be further fixed to a wheelchair chassis. Seat frame 210, in some embodiments, is movably coupled to base frame 220 such that seat frame 210 is capable of moving relative to base frame 220 in at least one of forward-backward motion, up-down motion, or tilting as will be explained further below. In some embodiments, one or more wheels or rollers (not shown) may be provided between seat frame 210 and base frame 220 which may be configured to facilitate relative motion between seat frame 210 and base frame 220. The wheels or rollers may be attached underneath seat frame 210 proximate forward end 212 according to some embodiments and configured to roll against a top surface of base frame 220 during relative motion between seat frame 210 and base frame 220.

In some embodiments, seat frame 210 is coupled to base frame 220 using one or more linkages. In some embodiments, seat frame 210 is coupled to base frame 220 using one or more pairs of linkages. In some embodiments, seat frame 210 is coupled to base frame 220 using a pair of first linkages 222 which are arranged on the left and right sides of base frame 220. In some embodiments, seat frame 210 is coupled to base frame 220 using a pair of second linkages 228 which are arrange on the left and right sides of base frame 220. For simplicity, only the left members of the pairs of linkages are shown in the side view presented in FIGS. 3-4L, however, it should be understood that the right members of the pairs of linkages can be symmetrically arranged on the right side of seat positioning system 200.

In some embodiments, each of first linkages 222 includes a first end slideably coupled to the base frame 220 and a second end connected to seat frame 210. In some embodiments, each of first linkages 222 may include a first member 122*a* and a second member 222*b* which are pivotally coupled with each other. First member 222*a*, in some embodiments, includes a first end coupled to base frame 220 and a second end pivotally coupled to second member 222*b*. In some embodiments, first member 222*a* is slideably coupled with base frame 220 such that first member 222*a* is capable of sliding in a forward-backward direction along a portion of base frame 220. In some embodiments, first member 222*a* is not configured to pivot relative to base frame 220. In some embodiments, base frame 220 includes a forward slot 224 arranged on each of the left and right sides of base frame 220 to which first member 222*a* is coupled. In some embodiments, first member 222*a* includes a pin 226*a* which is received within forward slot 224 and configured to slide within forward slot 124 between a front end 224*a* and a back end 224*b* of forward slot 224. Pin 226*a* may be configured as or further includes a rod, block, bolt, wheel, roller, ball bearing, or other sliding element that is capable of sliding along forward slots 224.

In further embodiments, seat positioning system 200 includes forward locking devices 236 which are capable of limiting or stopping the sliding of first linkages 222 relative to forward slots 224. In some embodiments, forward locking devices 236 are configured to limit or stop the sliding of first member 222*a* relative to forward slots 224. In some embodiments, forward locking devices 236 includes a locked configuration which prevents first member 222*a* from sliding relative to forward slots 224 and an unlocked configuration which permits first member 222*a* to slide relative to forward slots 224. In some embodiments, forward locking devices 236 includes a plunger which, in the locked configuration, is extended to physically block pin 226*a* from sliding within forward slots 224. In the unlocked configuration, the plunger is retracted such that pin 226*a* is cleared to slide within forward slots 124. In some embodiments, the plunger is a solenoid-actuated plunger, such as a tubular linear solenoid. One non-limiting example of a tubular linear solenoid that may be suitable for use in forward locking devices 236 is the LEDEX® Size 100M STA® Push Tubular Solenoids—26 mm diameter×52 mm (Part Number: 195227-XXX). In other embodiments, each forward locking device 236 is configured as a catch, for example, catch 400 described above with reference to FIG. 5.

Second member 222*b* in some embodiments includes a first end which is pivotally coupled to the second end of first member 222*a*. In some embodiments, first end of second member 222*b* is coupled to second end of first member 222*a* by a pivot pin 226*b* which allows for second member 222*b* to pivot relative to first member 222*a*. In some embodiments, second member 222*b* includes a second end which is pivotally coupled to a third member 222*c* of first linkage 222. In some embodiments, third member 222*c* includes a first end which is pivotally coupled to second end of second member 222*b* by a pivot pin 226*c*. In further embodiments, third member 222*c* includes a second end that is pivotally coupled to seat frame 210. In some embodiments, the second end of third member 222*c* is coupled to seat frame 210 at a location between front end 212 and back end 214 by a pivot pin 226*d* which allows for third member 222*c* to pivot relative to seat frame 210.

In other embodiments, first members 222*a* of first linkages 222 need not be present. According to these embodiments, the first end of second members 222*b* may be coupled directly with forward slots 224 by pin 226*a* and be configured to slide within forward slots 224 and pivot relative to base frame 220. In some such embodiments, forward locking devices 236 may be configured to allow or prevent second members 222*b* from sliding within forward slots 124 in the unlocked and locked configurations in a manner similar to that described above. In yet further embodiments, third member 222*c* need not be present. According to these embodiments, the second end of second members 222*b* may be pivotally coupled directly to seat frame 210. FIG. 6 described further below illustrates an example having such a configuration.

In some embodiments, each of second linkages 228 may include a first member 228*a* and a second member 228*b* which are pivotally coupled with each other. First member 228*a*, in some embodiments, includes a first end coupled to base frame 220 and a second end pivotally coupled to second member 228*b*. In some embodiments, first member 228*a* is slideably coupled with base frame 220 such that first member 228*a* is capable of sliding in a forward-backward direction along a portion of base frame 220. In some embodiments, first member 228*a* is not configured to pivot relative to base frame 220. In some embodiments, base frame 220 includes a rear slot 230 arranged on each of the left and right sides of base frame 220 to which first member 228*a* is coupled. In some embodiments, first member 228*a* includes a pin 232*a* which is received within rear slot 230 and configured to slide within rear slot 230 between a front end 230*a* and a back end 230*b* of rear slot 230. Pin 232*a* may be configured as or further includes a rod, block, bolt, wheel, roller, ball bearing, or other sliding element that is capable of sliding along rear slots 230.

In further embodiments, seat positioning system 200 includes rear locking devices 238 which are capable of limiting or stopping the sliding of second linkages 228 relative to rear slots 230. In some embodiments, rear locking devices 238 are configured to limit or stop the sliding of first member 228*a* relative to rear slots 230. In some embodiments, rear locking devices 238 includes a locked configuration which prevents first member 228*a* from sliding relative to rear slots 230 and an unlocked configuration which permits first member 228*a* to slide relative to rear slots 230. In some embodiments, rear locking devices 238 includes a plunger which, in the locked configuration, is extended to physically block pin 232*a* from sliding within rear slots 230. In the unlocked configuration, the plunger is retracted such that pin 232*a* is cleared to slide within rear slots 230. In some embodiments, the plunger is a solenoid-actuated plunger, such as a tubular linear solenoid. One non-limiting example of a tubular linear solenoid that may be suitable for use in rear locking devices 238 is the LEDEX® Size 100M STA® Push Tubular Solenoids—26 mm diameter×52 mm (Part Number: 195227-XXX). In other embodiments, each rear locking device 238 is configured as a catch, for example, catch 400 described above with reference to FIG. 5.

Second member 228*b* in some embodiments includes a first end which is pivotally coupled to the second end of first member 228*a*. In some embodiments, first end of second member 228*b* is coupled to second end of first member 228*a* by a pivot pin 232*b* which allows for second member 228*b* to pivot relative to first member 228*a*. In some embodiments, second member 228*b* includes a second end which is pivotally coupled to seat frame 210. In some embodiments, the second end of second member 122*b* is coupled to seat frame 210 at a location at or proximate to back end 114 by a pivot pin 232*c* which allows for second member 228*b* to pivot relative to seat frame 210.

In some embodiments, first members 228*a* of second linkages 228 need not be present. According to these embodiments, the first end of second members 228*b* may be coupled directly with rear slots 230 by pin 232*a* and be configured to slide within rear slots 230 and pivot relative to base frame 220. FIG. 6 described further below illustrates an example having such a configuration. In some such embodiments, rear locking devices 238 may be configured to allow or prevent second members 228*b* from sliding within rear slots 230 in the unlocked and locked configurations in a manner similar to that described above.

Seat positioning system 200, in some embodiments, also includes one or more actuators which are configured to move seat frame 210 relative to base frame 220. In some embodiments, seat positioning system 200 includes only a single actuator configured to move seat frame 210 relative to base frame 220. In other embodiments, seat positioning system 200 includes more than one actuator which are arranged in parallel. As shown in FIGS. 3-4L, seat positioning system 200 includes an actuator 234 positioned generally below seat frame 210. In some embodiments, actuator 234 is a linear actuator which is configured to extend or contract along a single axis. In some embodiments, actuator 234 is one of a mechanical linear actuator, a hydraulic linear actuator, or a pneumatic linear actuator. In some embodiments, actuator 234 includes a telescoping body (e.g., piston-cylinder, screw-type actuator, etc.). Actuator 234 in some embodiments includes a first end that is pivotally connected to seat frame 210 and a second end that is pivotally connected to base frame 220. The first end of actuator 234 may be connected to seat frame 210 at a location at or proximate to back end 214.

In certain embodiments, activation of actuator 234 will cause seat frame 210 to move relative to base frame 220, which will be explained with particular reference to FIGS. 4A-4L. FIGS. 4A-4C show the forward movement of seat frame 210 relative to base frame 220 according to some embodiments of the present invention. In these embodiments, each of forward locking devices 236 and rear locking devices 238 are in an unlocked configuration which allows first linkages 222 and second linkages 228 to respectively slide within forward slots 224 and rear slots 230 along a forward-backward direction (left-right in the page of the figures). As shown in FIG. 4A, actuator 234 is in an extended state, pin 226*a* is positioned at back end 224*b* of forward slot 224, and pin 232*a* is positioned at back end 230*b* of rear slot 230. As actuator 234 contracts, as shown in FIGS. 4B and 4C, seat frame 210 slides forward (i.e., towards the left of the page of the figures) relative to seat frame 220 such that front end 212 of seat frame 210 extends further away from base frame 220. In some embodiments, seat frame 210 does not tilt and/or raise/lower with respect to base frame 220 during the forward movement. Meanwhile first linkages 222 slides towards front end 224*a* of forward slot 224 and second linkages 228 slides towards front end 230*a* of rear slot 230. Extending actuator 234 starting from the position shown in FIG. 4C would cause the reverse movement such that seat frame 210 moves backward (i.e., towards the right of the page of the figures) relative to seat frame 220 towards the original position shown in FIG. 4A.

FIGS. 4D-4F show the backward tilting movement of seat frame 210 relative to base frame 220 according to some embodiments of the present invention. In these embodiments, forward locking devices 236 are in a locked configuration such that first linkages 222 are prevented from sliding with forward slots 224 while rear locking devices 238 are in an unlocked configuration such that second linkages 228 are permitted to slide within rear slots 230. As actuator 234 contracts as shown in FIGS. 4E and 4F, second linkages 228 slides forward towards front end 230*a* of rear slots 230. However, since forward locking device 236 prevents first linkages 222 from sliding within forward slots 224, second members 222*b* of first linkages 222 pivots relative to base frame 220 causing seat frame 210 to tilt backwards relative to base frame 220 such that forward end 212 is raised higher than back end 214. Extension of actuator 234 from the position shown in FIG. 4F would cause the reverse movement such that seat frame 210 moves towards the original position shown in FIG. 4D.

FIGS. 4G-4I show the forward tilting movement of seat frame 210 relative to base frame 220 according to some embodiments of the present invention. In these embodiments, forward locking devices 236 are in an unlocked configuration such that first linkages 222 are allowed to slide relative to forward slots 224 while rear locking devices 238 are in locked configuration such that second linkages 228 are prevented from sliding relative to rear slots 230. As actuator 234 contracts as shown in FIGS. 4H and 4I, second linkages 228 are unable to slide forward within rear slots 230 due to rear locking devices 238. Accordingly, second members 228*b* of second linkages 228 pivot relative to base frame 220 causing back end 214 of seat frame 210 to raise relative to forward end 212 and causing seat frame 210 to tilt forward relative to base frame 220. Extension of actuator 234 from the position shown in FIG. 4I would cause the reverse movement such that seat frame 210 moves towards the original position shown in FIG. 4G.

FIGS. 4J-4L show the vertical movement of seat frame 210 relative to base frame 220 according to some embodiments of the present invention. In these embodiments, each of forward locking devices 236 and rear locking devices 238 are in locked configurations such that first linkages 222 and second linkages 228 are prevented from sliding within forward slots 224 and rear slots 230, respectively. As actuator 234 contacts as shown in FIGS. 4K and 4L, second members 222*b* of first linkages 222 and second members 228*b* of second linkages 228 pivot relative to base frame 220. This in turn pushes seat frame 210 upwards relative to base frame 220 causing seat frame 210 to lift. In some embodiments, seat frame 210 does not tilt with respect to base frame 220 as it is lifted relative to base frame 220 (e.g., maintains substantially horizontal position). In some embodiments, seat frame 210 also moves in a forward direction as it is lifted. Extension of actuator 234 from the position shown in FIG. 4L would cause the reverse movement such that seat frame 210 moves towards the original position shown in FIG. 4J.

FIG. 6 shows an example seat positioning system generally designated 500 in accordance with a further embodiment of the present invention. Similar to seat positioning systems 100, 200 described above, seat positioning system 500 in some embodiments includes a seat frame 510 having a forward end 512 and a back end 514. In some embodiments, seat frame 510 is configured to support a seat that can be used, for example, on a motorized wheelchair. In some embodiments, seat frame 510 is coupled to a base frame 520 which may be generally situated below seat frame 510. Base frame 520, in some embodiments, may be further fixed to a wheelchair chassis. Seat frame 510 and base frame 520 may be configured similarly as seat frames 110, 210 and base frames 120, 220 described in the embodiments above. Seat frame 510 is movably coupled to base frame 520 such that seat frame 510 is capable of moving relative to base frame 520 in at least one of forward-backward motion, up-down motion, or tilting as described above for seat positioning systems 100, 200. In some embodiments, one or more wheels or rollers 513 may be provided between seat frame 510 and base frame 520 which may be configured to facilitate relative motion between seat frame 510 and base frame 520. The wheels or rollers 513 may be attached underneath seat frame 510 proximate forward end 512 according to some embodiments and configured to roll against a top surface of base frame 520 during relative motion between seat frame 510 and base frame 520. In further embodiments, seat positioning system 500 includes an actuator (not shown) which is configured to move seat frame 510 relative to base frame 520. The actuator, which may be a linear actuator according to some embodiments, may be configured similarly to actuators 134, 234 described above.

As further with seat positioning systems 100, 200, in some embodiments, seat frame 510 is coupled to base frame 520 using one or more linkages. In some embodiments, seat frame 510 is coupled to base frame 520 using one or more pairs of linkages. In some embodiments, seat frame 510 is coupled to base frame 520 using a pair of first linkages 522 which are arranged on the left and right sides of base frame 520. In some embodiments, seat frame 510 is coupled to base frame 520 using a pair of second linkages 528 which are arrange on the left and right sides of base frame 520. For simplicity, only the left members of the pairs of linkages are shown in the side views presented in FIG. 6, however, it should be understood that the right members of the pairs of linkages can be symmetrically arranged on the right side of seat positioning system 500.

In some embodiments, each of first linkages 522 includes a first end which is pivotally coupled to base frame 520 and a second end which is pivotally coupled to seat frame 510. The first end of first linkage 522 may be coupled to base frame 520 by pin 526*a*, and the second end of first linkage 522 may be coupled to seat frame 510 by pin 526*b*. In some embodiments, first linkage 522 is further slidably coupled with base frame 520 such that first linkage 522 is capable of sliding in a forward-backward direction along a portion of base frame 520. In some embodiments, base frame 520 includes a forward slot 524 arranged on each of the left and right sides of base frame 520 to which first the first end of first linkage 522 is coupled. In some embodiments, pin 526*a* is received within forward slot 524 and configured to slide within forward slot 524. Pin 526*a* may be configured as or further includes a rod, block, bolt, wheel, roller, ball bearing, or other sliding element that is capable of sliding along forward slots 524.

In some embodiments, each of second linkages 528 includes a first end which is pivotally coupled to base frame 520 and a second end which is pivotally coupled to seat frame 510. The first end of second linkage 528 may be coupled to base frame 520 by pin 532*a*, and the second end of second linkage 528 may be coupled to seat frame 510 by pin 532*b*. In some embodiments, second linkage 528 is further slidably coupled with base frame 520 such that second linkage 528 is capable of sliding in a forward-backward direction along a portion of base frame 520. In some embodiments, base frame 520 includes a rear slot 530 arranged on each of the left and right sides of base frame 520 to which first the first end of second linkage 528 is coupled. In some embodiments, pin 532*a* is received within rear slot 530 and configured to slide within rear slot 530. Pin 532*a* may be configured as or further includes a rod, block, bolt, wheel, roller, ball bearing, or other sliding element that is capable of sliding along rear slots 530.

Similar to seat positioning systems 100, 200, one or more locking devices may be provided with seat positioning system 500 which are configured to limit or prevent first and/or second linkages 522, 528 from sliding relative to base frame 520 in a locked configuration. FIG. 6 shows a rear locking device 538 which is configured to prevent pin 532*a* from sliding within rear slot 530 in a locked configuration, and allow pin 532*s* to slide within rear slot 530 in an unlocked configuration. Forward locking devices (not shown) may also be provided which is configured to prevent or allow pin 526*a* to slide within front slot 524. Both forward and rear locking devices may be configured as catch 400 described herein with reference to FIG. 5 according to some embodiments. In other embodiments, front and rear locking devices include solenoid-actuated plungers, for example the tubular linear solenoids as described above. The forward and rear locking devices can be locked and unlocked in various combinations to allow for the different motions of seat frame 510 relative to base frame 520 as, for example, described in relation to FIGS. 4A-4L with respect to seat positioning system 200.

Figure 7A:
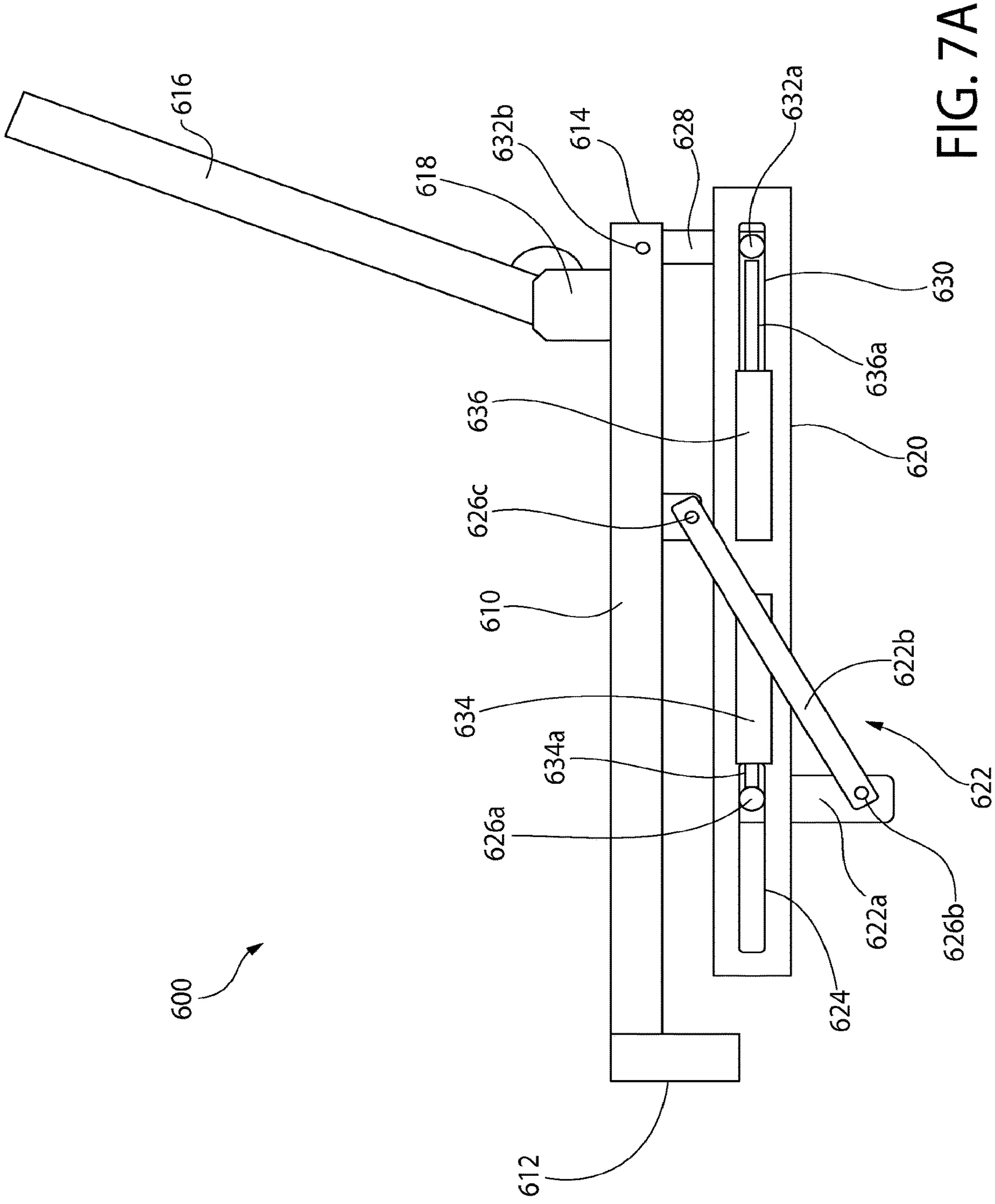
FIGS. 7A-7C show left side views of a seat positioning system in accordance with a further embodiment of the present invention.
Figure 7B:
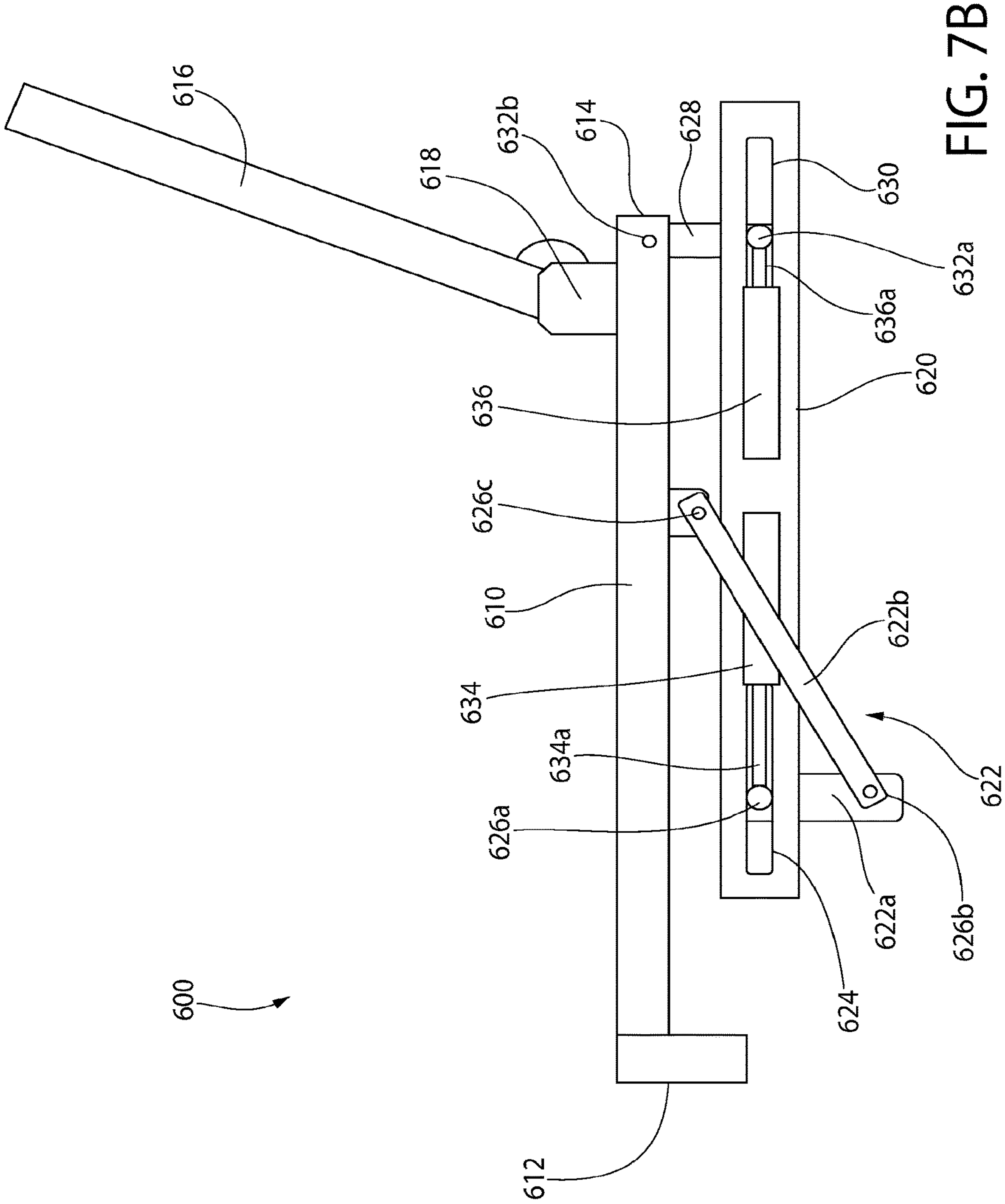
Figure 7C:
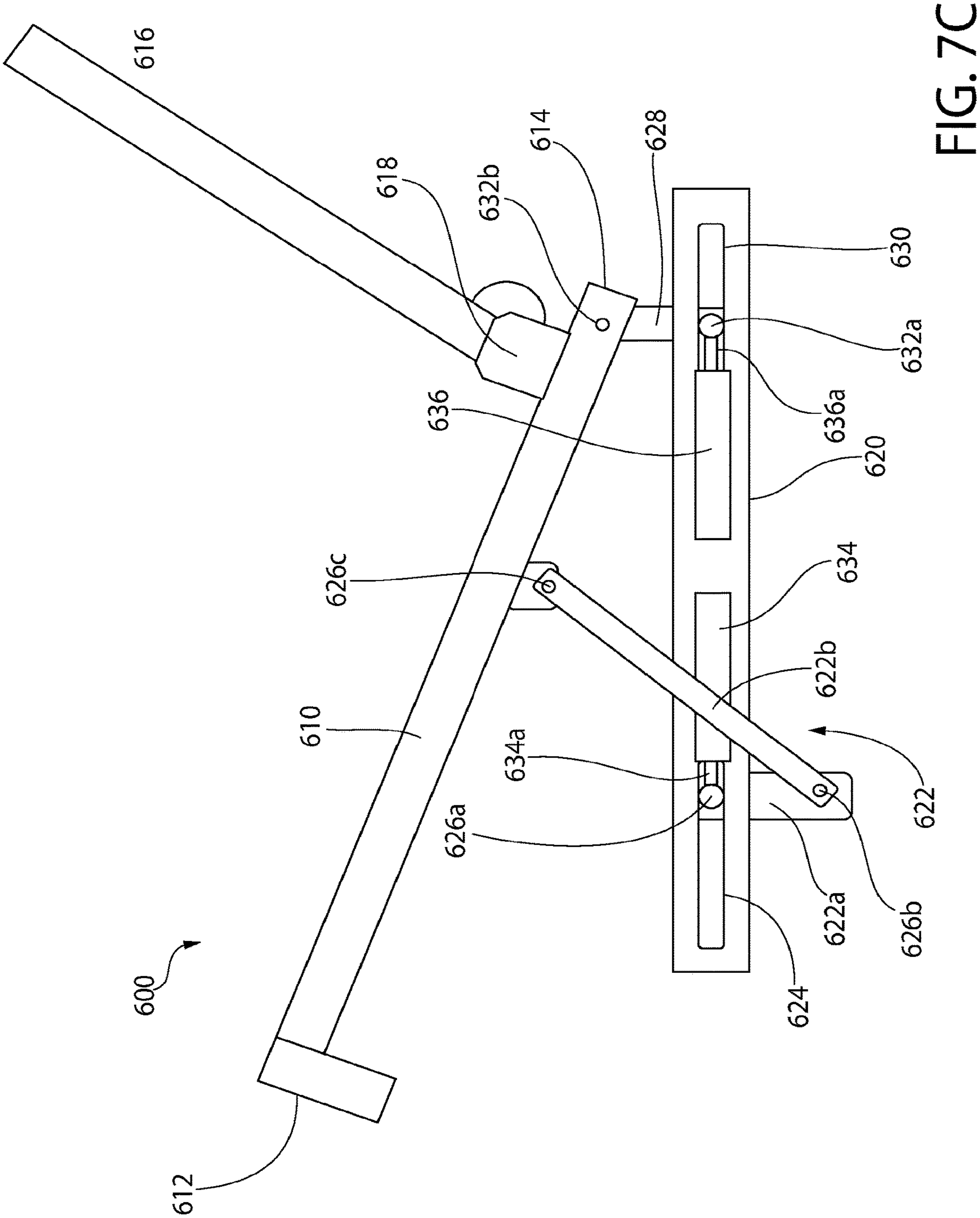

FIGS. 7A-7C show a further seat positioning system 600 in accordance with another embodiment of the present invention. Seat positioning system 600 in some embodiments includes a seat frame 610 having a forward end 612 and a back end 614. In some embodiments, similar to seat frames 110, 210, and 510 described above, seat frame 610 is configured to support a seat that can be used, for example, on a motorized wheelchair. In further embodiments, a back support 616 configured to support a seat back is connected to seat frame 610 proximate back end 614. In some embodiments, back support 616 may be connected to seat frame 610 with an adjustable angle connector 618 which permits back support 616 to pivot relative to seat frame 610 through a range of predetermined angles.

In some embodiments, seat frame 610 is coupled to a base frame 620 which may be generally situated below seat frame 610. Base frame 620, in some embodiments, may be further fixed to a wheelchair chassis. Seat frame 610, in some embodiments, is movably coupled to base frame 620 such that seat frame 610 is capable of moving relative to base frame 620 in at least one of forward-backward motion, up-down motion, or tilting. In some embodiments, one or more wheels or rollers (not shown) may be provided between seat frame 610 and base frame 620 which may be configured to facilitate relative motion between seat frame 610 and base frame 620. The wheels or rollers may be attached underneath seat frame 610 proximate forward end 612 according to some embodiments and configured to roll against a top surface of base frame 620 during relative motion between seat frame 610 and base frame 620.

In some embodiments, seat frame 610 is coupled to base frame 620 using one or more linkages. In some embodiments, seat frame 610 is coupled to base frame 620 using one or more pairs of linkages. In some embodiments, seat frame 610 is coupled to base frame 620 using a pair of first linkages 622 which are arranged on the left and right sides of base frame 620. In some embodiments, seat frame 610 is coupled to base frame 620 using a pair of second linkages 628 which are arranged on the left and right sides of base frame 620. For simplicity, only the left members of the pairs of linkages are shown in the side views presented in FIGS. 7A-7C, however, it should be understood that the right members of the pairs of linkages can be symmetrically arranged on the right side of seat positioning system 600.

In some embodiments, each of first linkages 622 includes a first end slideably coupled to the base frame 620 and a second end connected to seat frame 610. In some embodiments, each of first linkages 622 may include a first member 622*a* and a second member 622*b* which are pivotally coupled with each other. First member 622*a*, in some embodiments, includes a first end coupled to base frame 620 and a second end pivotally coupled to second member 622*b*. First member 622*a* may be pivotally coupled to second member 622*b* by a pin 626*b*. In some embodiments, first member 622*a* is slidably coupled with base frame 620 such that first member 622*a* is capable of sliding in a forward-backward direction along a portion of base frame 620. In some embodiments, first member 622*a* is not configured to pivot relative to base frame 620. In some embodiments, base frame 620 includes a forward slot 624 arranged on each of the left and right sides of base frame 620 to which first member 622*a* is coupled. In some embodiments, first member 622*a* includes a pin 626*a* which is received within forward slot 624 and configured to slide within forward slot 624 between a front end and a back end of forward slot 624. Pin 626*a* may be configured as or further includes a rod, block, bolt, wheel, roller, ball bearing, or other sliding element that is capable of sliding along forward slots 624. In some embodiments, first members 622*a* of first linkages 622 need not be present. According to these embodiments, the first end of second members 622*b* may be coupled directly with forward slots 624 by pin 626*a* and be configured to slide within forward slots 624 and pivot relative to base frame 620. In some embodiments, the second end of second members 622*b* may be pivotally coupled to seat frame 610 by a pin 626*c*.

In some embodiments, each of second linkages 628 includes a single member having ends that may be pivotally coupled with base frame 620 and seat frame 610. In some embodiments, each of second linkages 628 includes a first end which is slideably coupled with base frame 620 such that each of second linkages 628 is capable of sliding in a forward-backward along a portion of base frame 620. In some embodiments, base frame 620 includes a rear slot 630 arranged on each of the left and right sides of base frame 620 to which second linkages 628 are coupled. In some embodiments, each of second linkages 628 includes a pin 632*a* which is received within rear slot 630 and configured to slide within rear slot 630 between a front end and a back end of rear slot 630. Pin 632*a* may be configured as or further includes a rod, block, bolt, wheel, roller, ball bearing, or other sliding element that is capable of sliding along rear slots 630. Each of second linkages 628 may further be provided with a further pin 632*b* which pivotally connects second ends of second linkages 628 with seat frame 610.

Seat positioning system 600, in some embodiments, also includes one or more actuators which are configured to move seat frame 610 relative to base frame 620. In some embodiments, the one or more actuators are configured and positioned to move pin 626*a* and/or pin 632*a* relative to base frame 620. In some embodiments, the one or more actuators are not directly connected to seat frame 610.

In some embodiments, seat positioning system 600 includes a first actuator 634 which is configured to move pin 626*a* within forward slot 624. In some embodiments, first actuator 634 is a linear actuator which is configured to extend or contract along a single axis. In some embodiments, first actuator 634 is one of a mechanical linear actuator, a hydraulic linear actuator, or a pneumatic linear actuator. In some embodiments, first actuator 634 includes a telescoping portion (e.g., piston-cylinder, screw-type actuator, etc.). In some embodiments, first actuator 634 is mounted onto base frame 620 and includes a telescoping portion 634*a* which is coupled to pin 626*a*. In some embodiments, first actuator 634 is configured to push and/or pull pin 626*a* within front slot 624 as telescoping portion 634*a* extends or contracts upon actuation of first actuator 634.

In some embodiments, seat positioning system 600 includes a second actuator 636 which is configured to move pin 632*a* within rear slot 630. In some embodiments, second actuator 636 is a linear actuator which is configured to extend or contract along a single axis. In some embodiments, second actuator 636 is one of a mechanical linear actuator, a hydraulic linear actuator, or a pneumatic linear actuator. In some embodiments, second actuator 636 includes a telescoping portion (e.g., piston-cylinder, screw-type actuator, etc.). In some embodiments, second actuator 636 is mounted onto base frame 620 and includes a telescoping portion 636*a* which is coupled to pin 632*a*. In some embodiments, second actuator 636 is configured to push and/or pull pin 632*a* within rear slot 630 as telescoping portion 634*a* extends or contracts upon actuation of second actuator 636.

In some embodiments, first and second actuators 634 and 636 cooperate in order to control movement of seat frame 610 relative to base frame 620. In some embodiments, first and second actuators 634 and 636 can be operated independently of each other. In the illustrated embodiment of FIG. 7A, first actuator 634 is shown in a contracted state while second actuator is shown in an extended state. As first actuator 634 extends and second actuator 636 contracts, pins 626*a* and 632*a* are moved in a forward direction within forward and rear slots 624, 630, respectively. This in turn causes first and second linkages 622 and 628 to translate forward relative to base frame 620, and causes seat frame 610 to move forward relative to base frame 620 as shown in FIG. 7B. In both of the positions shown in FIGS. 7A and 7B, seat frame 610 is generally parallel to base frame 620.

FIG. 7C shows seat positioning system 600 in a backward tilted position according to one embodiment. As second actuator 636 contracts, second linkages 628 slides forward relative to rear slot 630. However, as first actuator 634 is also in a contracted state, first linkage 622 is prevented from sliding forward within forward slots 124 thereby causing second member 622*b* of first linkage 622 to pivot relative to base frame 620 (e.g., about pin 626*c*). This in turn causes seat frame 610 to tilt backwards relative to base frame 620 such that forward end 612 is raised higher than back end 614. Extension of second actuator 636 while first actuator 634 is in a contracted state would return seat frame 610 to the position shown in FIG. 7A relative to base frame 620.

Figure 8A:
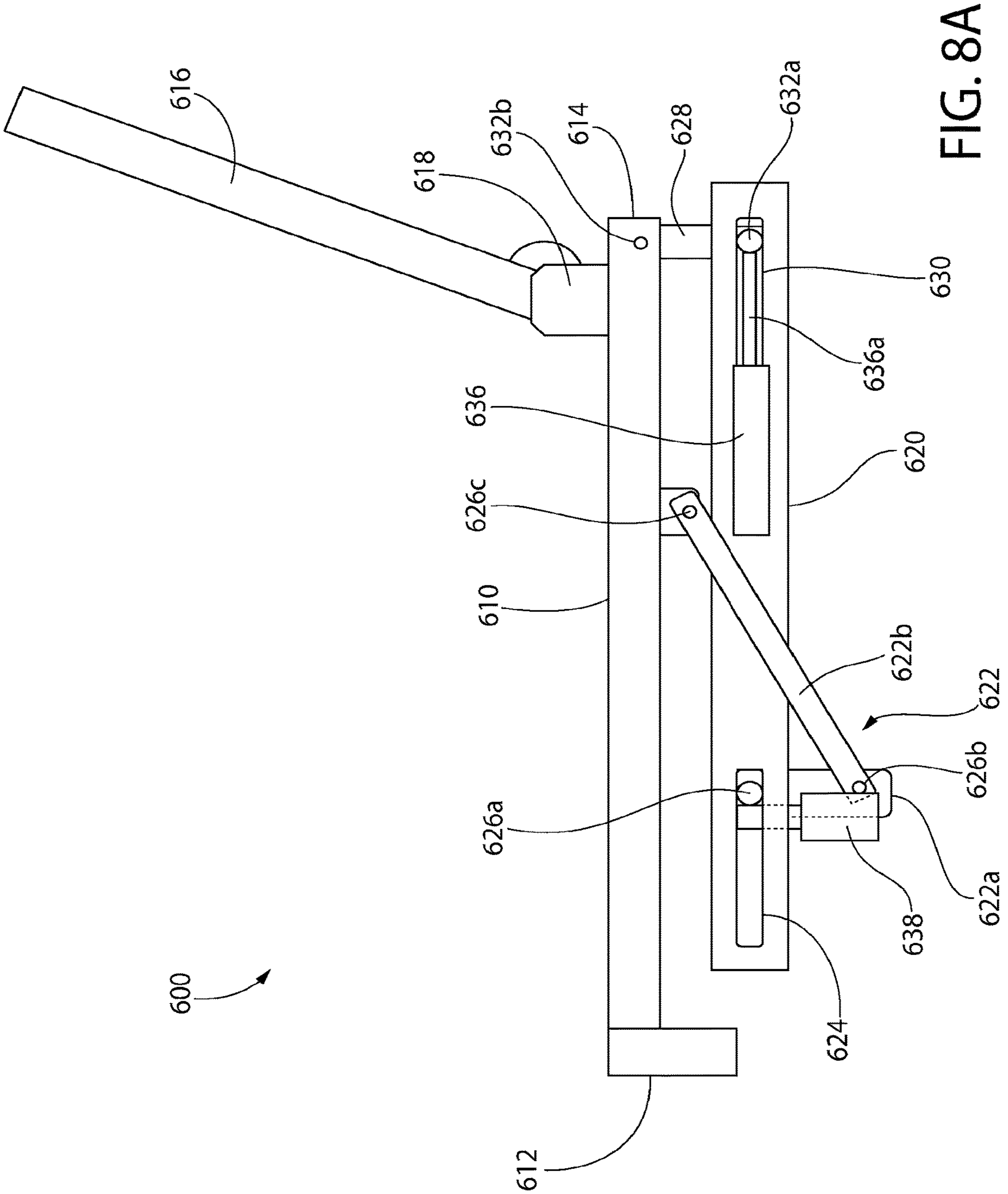
FIGS. 8A-8C show left side views of a seat positioning system in accordance with another embodiment of the present invention.
Figure 8B:
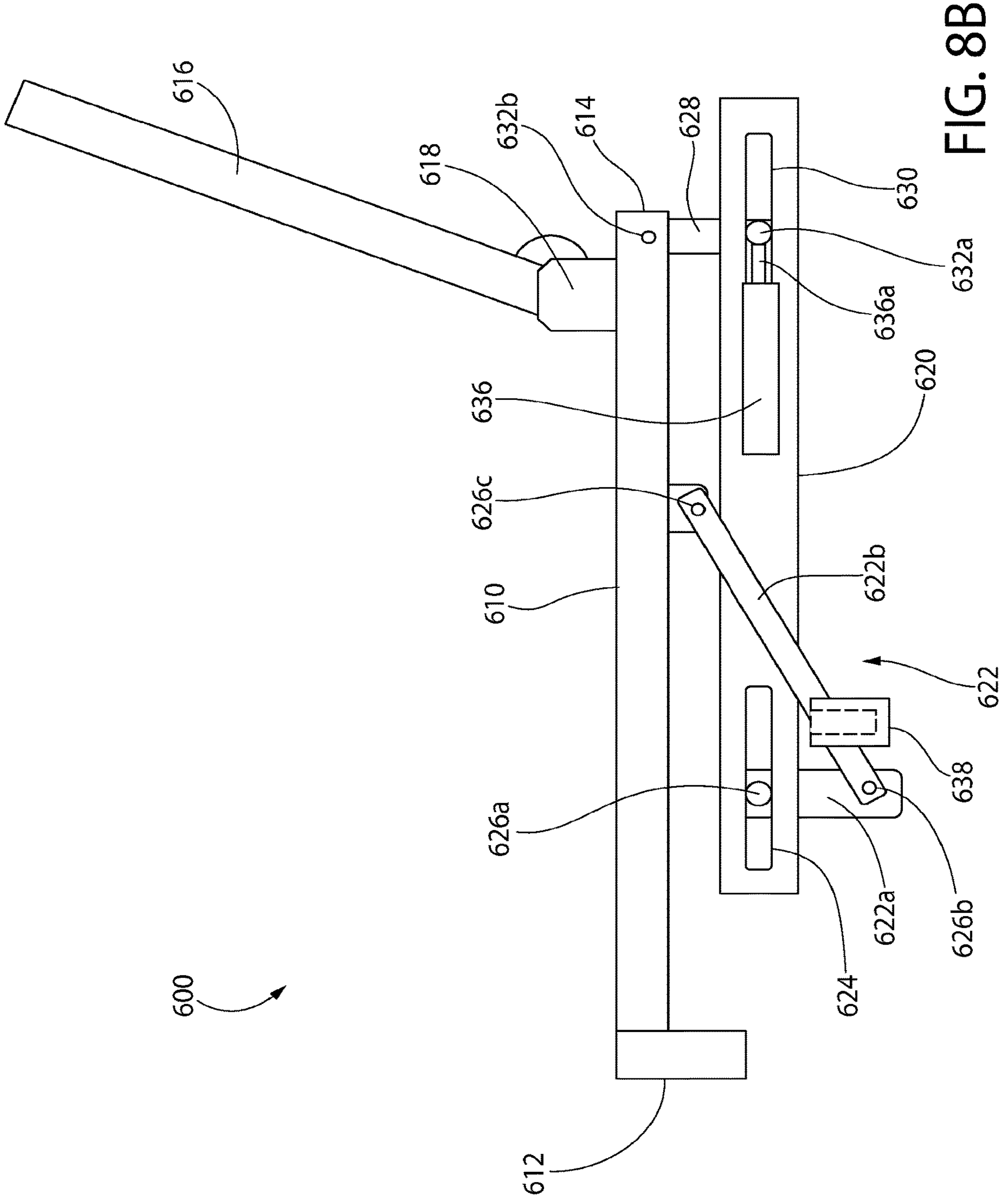
Figure 8C:
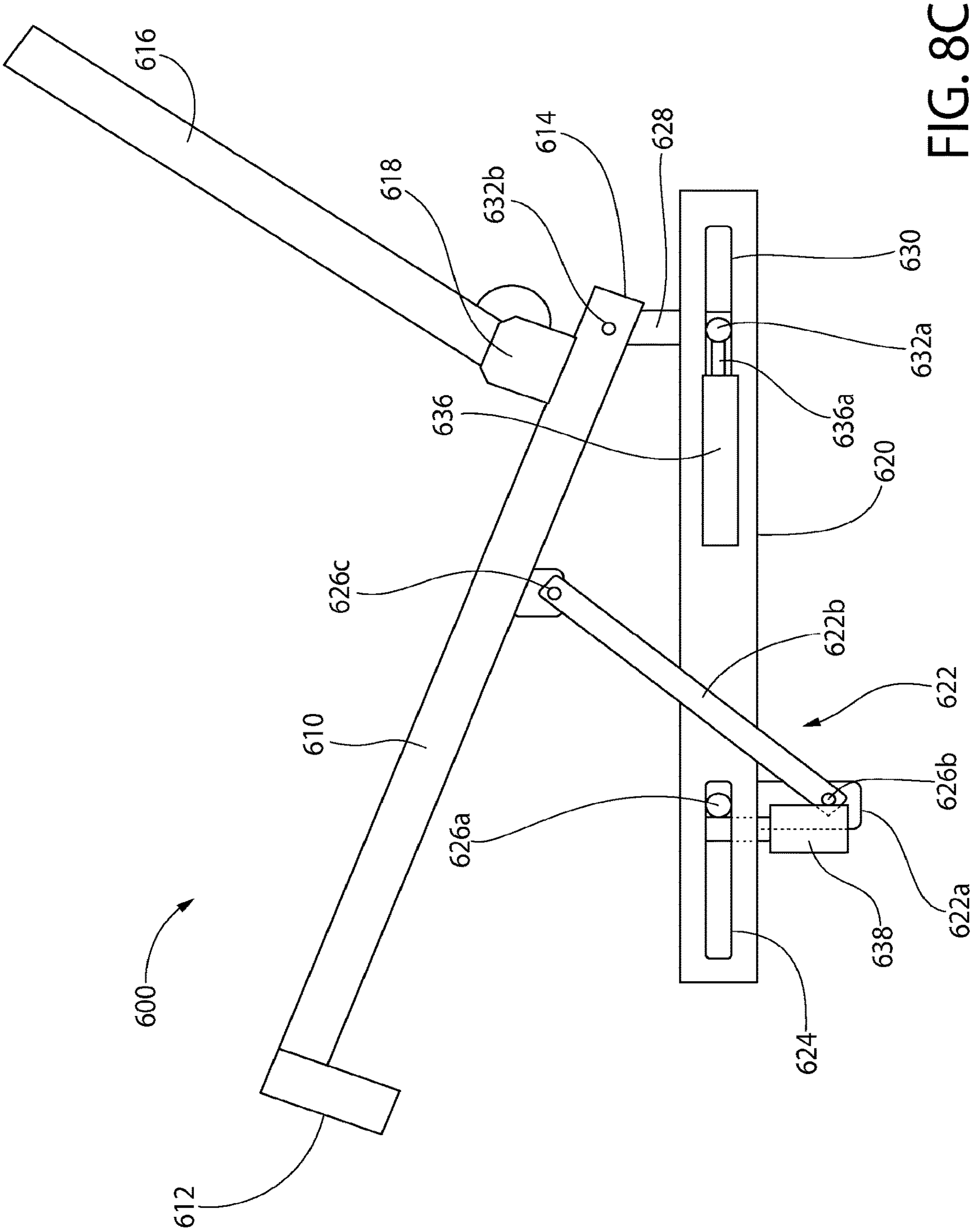

FIGS. 8A-8C show a variation of seat positioning system 600 in accordance with another embodiment of the present invention. According to this embodiment, seat positioning system 600 does not include first actuator 634. Instead, seat positioning system 600 includes forward locking devices 638 which are capable of limiting or stopping the sliding of first linkages 622 relative to forward slots 624. In some embodiments, forward locking devices 638 are configured to limit or stop the sliding of first member 622*a* relative to forward slots 624. In some embodiments, forward locking devices 638 include a locked configuration which prevents first member 622*a* from sliding relative to forward slots 624 and an unlocked configuration which permits first member 622*a* to slide relative to forward slots 624. In some embodiments, forward locking devices 638 each include a plunger which, in the locked configuration, is extended to physically block pin 626*a* from sliding within forward slots 624. In the unlocked configuration, the plunger is retracted such that pin 626*a* is cleared to slide within forward slots 624. Forward locking devices 638 may be configured similarly to forward locking devices 136, 236 discussed above. In some embodiments, the plunger is a solenoid-actuated plunger, such as a tubular linear solenoid. One non-limiting example of a tubular linear solenoid that may be suitable for use in forward locking devices 136 is the LEDEX® Size 100M STA® Push Tubular Solenoids—26 mm diameter×52 mm (Part Number: 195227-XXX). In other embodiments, each forward locking device 638 includes a catch which is configured to pivot in a first direction to prevent movement of first linkage 622 relative to forward slots 624 in a locked configuration, and pivot in a second direction to allow movement of the first linkage 622 relative to forward slots 624 in an unlocked configuration. An example of a catch that may be used for forward locking devices 638 is shown in FIG. 5, discussed above, which depicts catch 400 configured to engage with a pin 300 on linkage 302 in order to allow or prevent linkage 302 from sliding with respect to slot 304.

In some embodiments, forward locking devices 638 cooperate with second actuator 636 to control the position and movement of seat frame 610 relative to base frame 620. As shown in FIG. 8A, forward locking devices 638 is in a locked configuration such that pin 626*a* is prevented from sliding within forward slot 624, and second actuator 636 is in an extended state. In this position, seat frame 610 is generally parallel to base frame 620. In FIG. 8B, forward locking devices 638 are in an unlocked configuration such that pin 626*a* is allowed to slide within forward slot 624. As second actuator 636 contracts, pins 626*a* and 632*a* are moved in a forward direction within forward and rear slots 624, 630, respectively. This in turn causes first and second linkages 622 and 628 to translate forward relative to base frame 620, and causes seat frame 610 to move forward relative to base frame 620. Seat frame 610 may remain generally parallel to base frame 620 during this forward motion.

If forward locking devices 638 are in a locked configuration as second actuator 636 contracts, as shown in FIG. 8C, pin 626*a* is prevented from sliding within forward slot 624 which causes second member 622*b* of first linkage 622 to pivot relative to base frame 620. This in turn causes seat frame 610 to tilt backwards relative to base frame 620 such that forward end 612 is raised higher than back end 614. Extension of second actuator 636 while forward locking devices 638 are in the locked configuration would return seat frame 610 to the position shown in FIG. 8A relative to base frame 620.

FIGS. 9 and 10A-10D show another seat positioning system 700 according to a further embodiment the present invention. Seat positioning system 700 in some embodiments includes a seat frame 710. In some embodiments, similar to seat frames 110, 210, 510, 610 described above, seat frame 710 is configured to support a seat that can be used, for example, on a motorized wheelchair. In further embodiments, seat frame 710 may be connected to features such as a back support (not shown) which is configured to support a seat back. The back support may be configured similarly as back support 116, 216, 616 previously described in the above embodiments.

In some embodiments, seat frame 710 is coupled to a base frame 720 which may be generally situated below seat frame 710. Base frame 720, in some embodiments, may be further fixed to a wheelchair chassis. Seat frame 710, in some embodiments, is movably coupled to base frame 720 such that seat frame 710 is capable of moving relative to base frame 720 in at least one of forward-backward motion, up-down motion, or tilting. In some embodiments, one or more wheels or rollers may be provided between seat frame 710 and base frame 720 which may be configured to facilitate relative motion between seat frame 710 and base frame 720. The wheels or rollers may be attached underneath seat frame 710 proximate a forward or rear end of seat frame 710 according to some embodiments and configured to roll against a top surface of base frame 720 during relative motion between seat frame 710 and base frame 720.

In some embodiments, seat frame 710 is coupled to base frame 720 using one or more linkages. In some embodiments, seat frame 710 is coupled to base frame 720 using one or more pairs of linkages. In some embodiments, seat frame 710 is coupled to base frame 720 using a pair of first linkages 722 which are arranged on the left and right sides of base frame 720. In some embodiments, seat frame 710 is coupled to base frame 720 using a pair of second linkages 728 which are arranged on the left and right sides of base frame 720. For simplicity, only the left members of the pairs of linkages are shown in the side views presented in FIGS. 10A-10D, however, it should be understood that the right members of the pairs of linkages can be symmetrically arranged on the right side of seat positioning system 700.

In some embodiments, each of first linkages 722 includes a single member having a first end slideably coupled to the base frame 720 and a second end connected to seat frame 710. In some embodiments, the first end of each of first linkages 722 is pivotally coupled to base frame 720. In some embodiments, the second end of each of first linkages 722 is pivotally coupled to seat frame 710. In some embodiments, each of first linkages 722 may be pivotally coupled to seat frame 710 by a pin 726*b*. In some embodiments, base frame 720 includes a slot 724 arranged on each of the left and right sides of base frame 720 to which the first linkages 722 are coupled. In some embodiments, each first linkage 722 includes a pin 726*a* which is received within one of slots 724 and configured to slide within slot 724 between a front end and a back end of slot 724. Pin 726*a* may be configured as or further includes a rod, block, bolt, wheel, roller, ball bearing, or other sliding element that is capable of sliding along slots 724.

In some embodiments, seat positioning system 700 includes forward locking devices 736 which are capable of limiting or stopping the sliding of first linkages 722 relative to slots 724. In some embodiments, forward locking devices 736 includes a locked configuration which prevents first linkages 722 from sliding relative to slots 724 and an unlocked configuration which permits first linkages 722 to slide relative to slots 724. In some embodiments, forward locking devices 736 includes a plunger 736*a* which, in the locked configuration, is extended to physically block pin 726*a* from sliding within slot 724. In the unlocked configuration, plunger 736*a* is retracted such that pin 726*a* is cleared to slide within slot 724. In some embodiments, plunger 736*a* is a solenoid-actuated plunger, such as a tubular linear solenoid. One non-limiting example of a tubular linear solenoid that may be suitable for use in forward locking devices 736 is the LEDEX® Size 100M STA® Push Tubular Solenoids—26 mm diameter×52 mm (Part Number: 195227-XXX). In other embodiments, each forward locking device 736 is configured as a catch, for example, catch 400 described above with reference to FIG. 5.

Figure 10A:
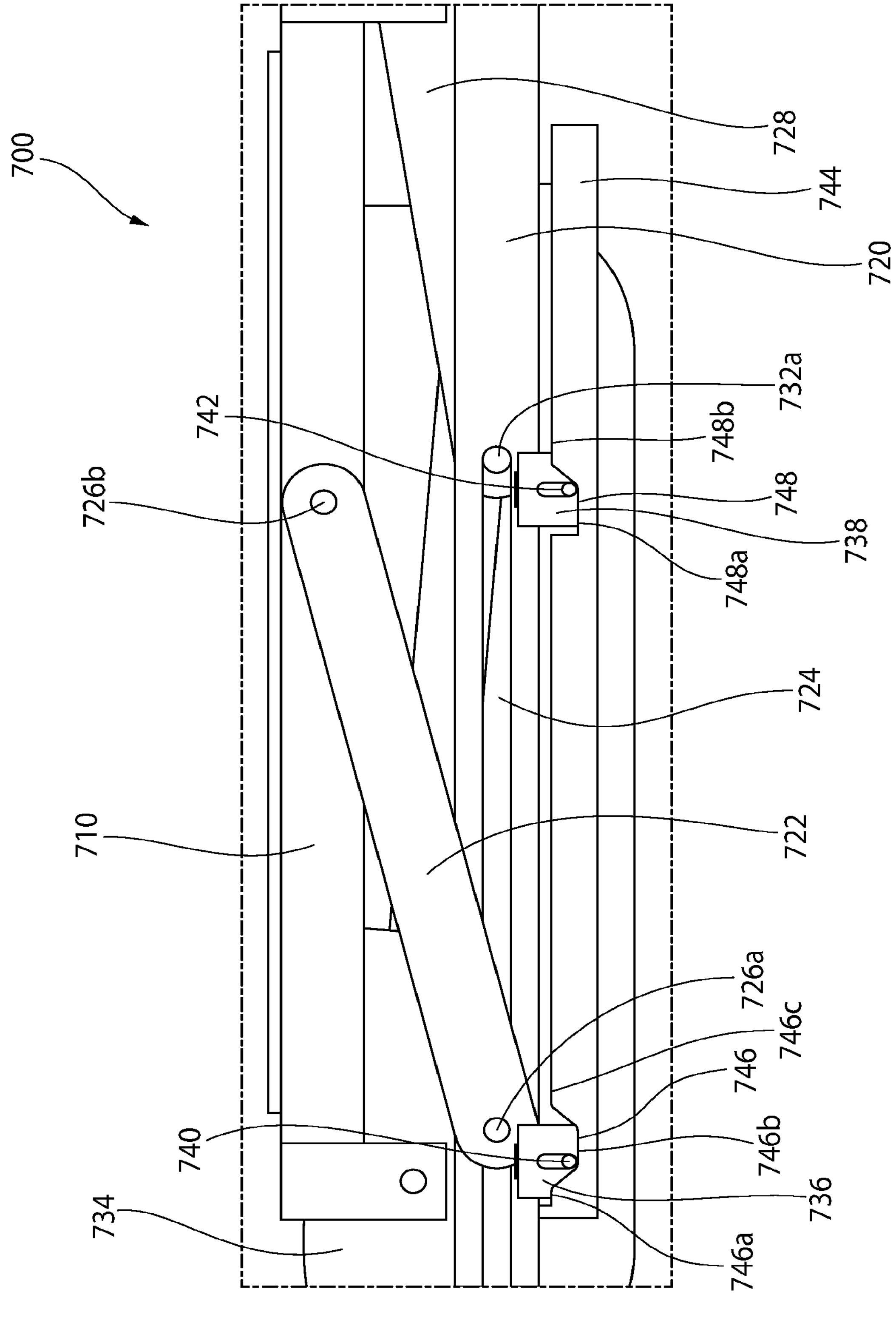
FIGS. 10A-10D show partial left side views of the seat positioning system of FIG. 9 with locking devices set at different locked and unlocked configurations.
Figure 10B:
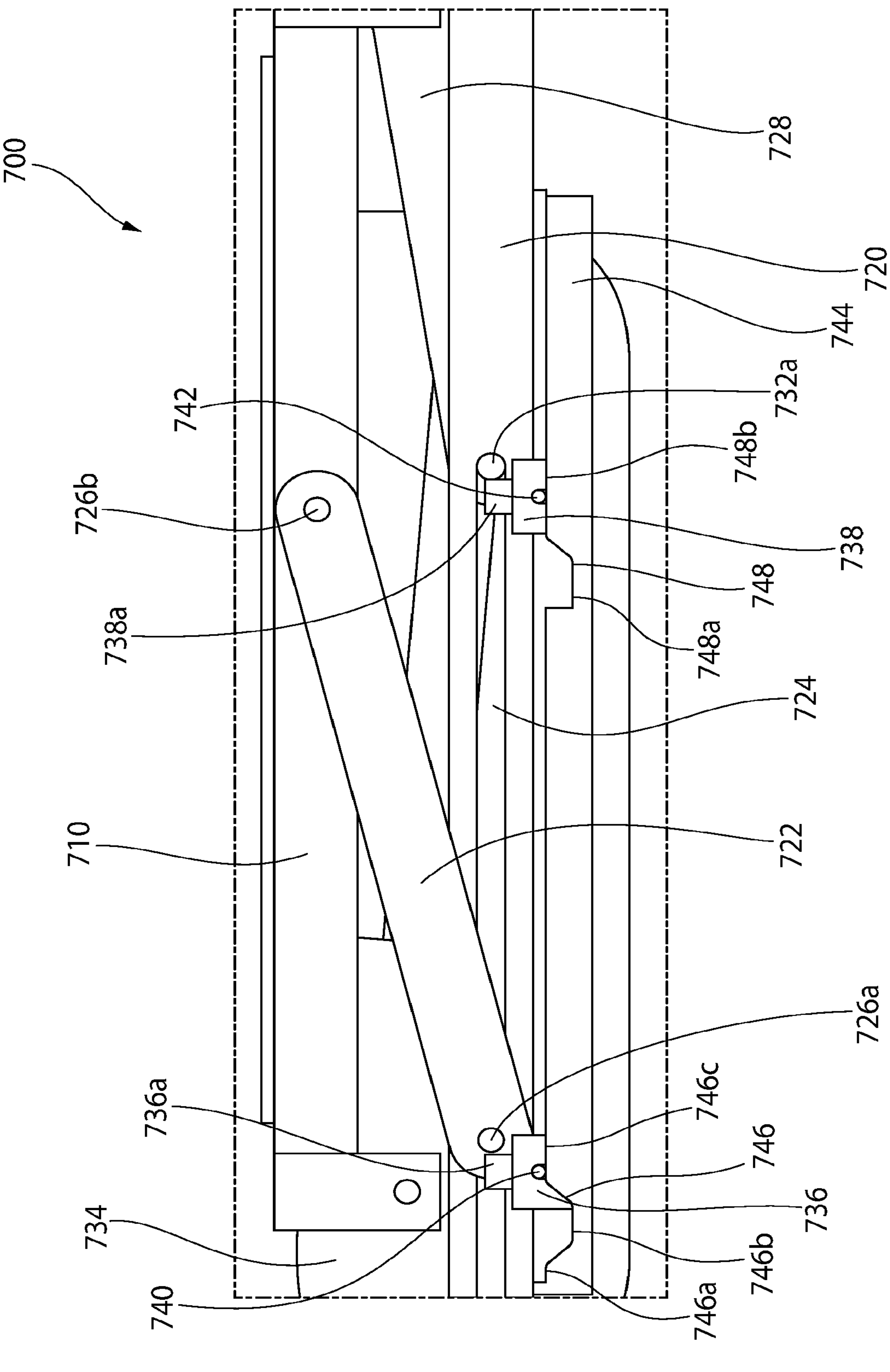
Figure 10C:
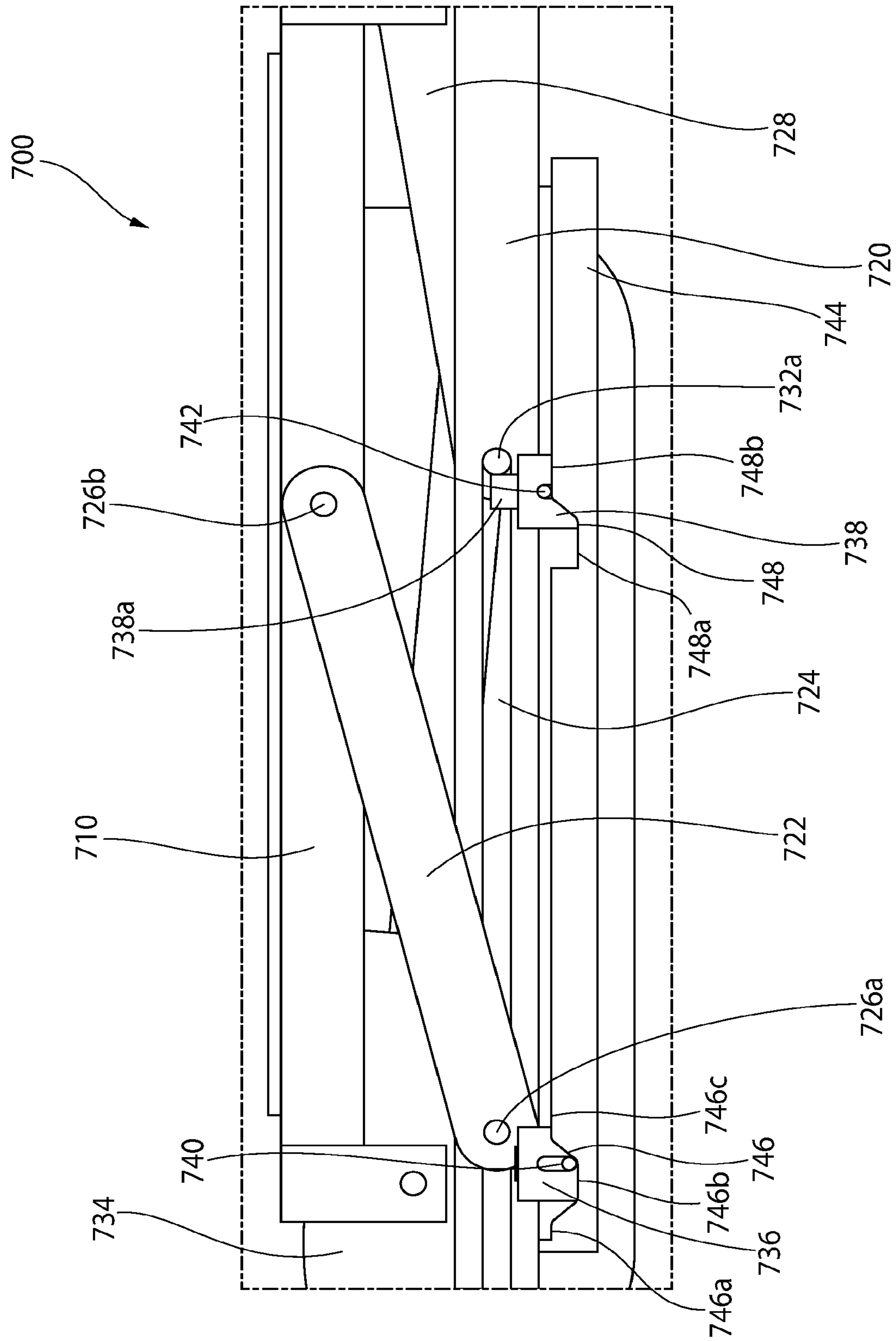

In some embodiments, the locking and unlocking of forward locking devices 736 may be actuated by a linear cam. In some embodiments, each forward locking device 736 includes a cam follower 740 which is configured to contact and follow front cam profile 746 provided on cam element 744. In some embodiments, front cam profile 746 includes at least a raised portion and a lowered portion which are configured to contact and set the position of cam follower 740. In some embodiments, cam element 744 is configured to move in a forward-backward movement relative to forward locking devices 736 and may be driven by a motor or actuator element 750 which can be controlled by via a wheelchair control system (not shown). Cam element 744 may also be configured to move in a forward-backward movement relative to base frame 720 and/or seat frame 710. While only the left side of cam element 744 is visible in FIGS. 9-10D, it should be understood that a similar or identical front cam profile 746 may be provided on the right side of cam element 744 to contact the cam follower 740 of the forward locking device 736 on the right. In some embodiments, front cam profile 746 may be a surface or edge profile on cam element 744 as shown. In some embodiments, front cam profile 746 may be configured as a slot, channel or groove on cam element 744 into which cam follower 740 extends, for example as shown in the embodiment of FIG. 11. As best seen in FIGS. 10A-10D, in some embodiments, front cam profile 746 includes a first raised portion 746*a*, a second raised portion 746*c*, and a lowered portion 746*b* situated between first raised portion 746*a* and second raised portion 746*c*. A sloped or slanted transition portion may be provided immediately between the lowered portion 746*b* and each of the first and second raised portions 746*a* and 746*c*. In some embodiments, as cam element 744 is moved forward/backward relative to forward locking devices 736, cam follower 740 follows the contour of front cam profile 746 and is raised when cam follower 740 is positioned along the first or second raised portions 746*a* and 746*c* or lowered when cam follower 740 is positioned along lowered portion 746*b*. In some embodiments, plunger 736*a* of forward locking device 736 extends when cam follower 740 is raised, or contracts when cam follower 740 is lowered. Thus, in some such embodiments, when cam follower 740 is raised, forward locking device 736 is in the locked configuration, and when cam follower 740 is lowered, forward locking devices 736 is in the unlocked configuration.

In some embodiments, each of second linkages 728 includes a single member having ends that may be pivotally coupled with base frame 720 and seat frame 710. In some embodiments, each of second linkages 728 includes a first end which is slideably coupled with base frame 720 such that each of second linkages 728 is capable of sliding in a forward-backward along a portion of base frame 720. In some embodiments, second linkages are coupled to slots 724 on base frame 720. In some embodiments, each of second linkages 728 includes a pin 732*a* which is received within a slot 724 and configured to slide within slot 724 between a front end and a back end of slot 724. Pin 732*a* may be configured as or further includes a rod, block, bolt, wheel, roller, ball bearing, or other sliding element that is capable of sliding along slots 724. Each of second linkages 728 may further be provided with a further pin 732*b* which pivotally connects second ends of second linkages 728 with seat frame 710.

In further embodiments, seat positioning system 700 includes rear locking devices 738 which are capable of limiting or stopping the sliding of second linkages 728 relative to slots 724. In some embodiments, rear locking devices 738 includes a locked configuration which prevents second linkages 728 from sliding relative to slots 724 and an unlocked configuration which permits second linkages 728 to slide relative to slots 724. In some embodiments, rear locking devices 738 are configured similarly as forward locking devices 736. In some embodiments, rear locking devices 738 includes a plunger 738*a* which, in the locked configuration, is extended to physically block pin 732*a* from sliding within slot 724. In the unlocked configuration, plunger 738*a* is retracted such that pin 732*a* is cleared to slide within slot 724. In some embodiments, plunger 738*a* is a solenoid-actuated plunger, such as a tubular linear solenoid. One non-limiting example of a tubular linear solenoid that may be suitable for use in rear locking devices 738 is the LEDEX® Size 100M STA® Push Tubular Solenoids—26 mm diameter×52 mm (Part Number: 195227-XXX). In other embodiments, each rear locking device 738 is configured as a catch, for example, catch 400 described above with reference to FIG. 5.

In some embodiments, the locking and unlocking of rear locking devices 738 may be actuated by a linear cam. In some embodiments, each rear locking device 738 includes a cam follower 742 which is configured to contact and follow rear cam profile 748 provided on cam element 744. In some embodiments, rear cam profile 748 includes at least a raised portion and a lowered portion which are configured to contact and set the position of cam follower 742. As described above with respect to forward locking devices 738, in some embodiments cam element 744 is configured to move in a forward-backward movement relative to rear locking devices 738 and may be driven by motor or actuator element 750. Again, while only the left side of cam element 744 is visible in FIGS. 9-10D, it should be understood that a similar or identical rear cam profile 748 may be provided on the right side of cam element 744 to contact the cam follower 742 of the rear locking device 738 on the right. In some embodiments, rear cam profile 748 may be a surface or edge profile on cam element 744 as shown. In some embodiments, rear cam profile 748 may be configured as a slot, channel, or groove on cam element 744 into which cam follower 742 extends, for example, as shown in the embodiment of FIG. 11. As best seen in FIGS. 10A-10D, in some embodiments, rear cam profile 746 includes a lowered portion 748*a* and raised portion 748*b*. A sloped or slanted transition portion may be provided immediately between the lowered portion 748*a* and raised portion 748*b*. In some embodiments, as cam element 744 is moved forward/backward relative to rear locking devices 738, cam follower 742 follows the contour of rear cam profile 748 and is raised when cam follower 742 is positioned along raised portion 748*b* or lowered when cam follower 742 is positioned along lowered portion 748*a*. In some embodiments, plunger 738*a* of rear locking device 738 extends when cam follower 742 is raised, or contracts when cam follower 742 is lowered. Thus, in some such embodiments, when cam follower 742 is raised, rear locking device 738 is in the locked configuration, and when cam follower 742 is lowered, rear locking devices 738 is in the unlocked configuration.

Seat positioning system 700, in some embodiments, further includes one or more actuators 734 which are configured to move seat frame 710 relative to base frame 720. In some embodiments, seat positioning system 700 includes only a single actuator 734 configured to move seat frame 710 relative to base frame 720. In other embodiments, seat positioning system 700 includes more than one actuator 734 which are arranged in parallel. In some embodiments, actuator 734 may be positioned generally below seat frame 710. In some embodiments, actuator 734 is a linear actuator which is configured to extend or contract along a single axis. In some embodiments, actuator 734 is one of a mechanical linear actuator, a hydraulic linear actuator, or a pneumatic linear actuator. In some embodiments, actuator 734 includes a telescoping body (e.g., piston-cylinder, screw-type actuator, etc.). Actuator 734 in some embodiments includes a first end that is pivotally connected to seat frame 710 and a second end that is pivotally connected to base frame 720. In other embodiments, actuator 734 may be positioned on the side of seat frame 710 and/or base frame 720. By providing the actuator on the sides of seat frame 710 and/or base frame 720, instead of beneath seat frame 710 according to certain embodiments, a space may be provided below seat frame 710 for other wheelchair components. For example, in some embodiments, a further lift mechanism (not show) such as a scissor-lift, piston, etc. that is configured to raise base frame 720 may be provided in the space. In certain embodiments, actuator 734 may include a pair of actuators that are positioned, for example, on the right and left sides of seat frame 710 and/or base frame 720. In some embodiments, actuator 734 includes a pair of screw-type actuators positioned on the right and left sides of seat frame 710 and/or base frame. In some embodiments, the pair of actuators may be driven by a common motor, or, in other embodiments, each of the pair of actuators may be driven by a separate motor. In some embodiments, the pair of actuators may extend or contract in unison during use. Actuator 734 may be controlled, in some embodiments, via a wheelchair control system (not shown).

In some embodiments, actuator 734 is able to cause seat frame 710 to move relative to base frame 720 in different degrees of motion depending on the locked and unlocked configurations of forward locking devices 736 and rear locking devices 738. These degrees of motion may include forward-backward motion, vertical motion, forward tilting, and backward tilting. When each of forward locking devices 736 and rear locking devices 738 are in an unlocked configuration, as shown in FIG. 10A, pins 726*a* and pins 732*a* are allowed to slide within slot 724. In some such embodiments, cam element 744 is positioned such that cam follower 740 of forward locking devices 736 is in a lowered position along lowered portion 746*b* of front cam profile 746. Cam element 744 is also positioned such that cam follower 742 of rear locking devices 738 is in a lowered position along lowered portion 748*a* of rear cam profile 748. In this arrangement, contraction/extension of actuator 734 is configured to cause seat frame 710 to slide forward/backward relative to base frame 720. This motion may be similar to that described for seat positioning system 200 in the embodiments shown in FIGS. 4A-4C. When each of forward locking devices 736 and rear locking devices 738 are in a locked configuration, as shown in FIG. 10B, pins 726*a* and pins 732*a* are prevented from sliding within slot 724. In some such embodiments, cam element 744 is positioned such that cam follower 740 of forward locking devices 736 is in a raised position along second raised portion 746*c* of front cam profile 746. Cam element 744 is also positioned such that cam follower 742 of rear locking devices 738 is in a raised position along raised portion 748*b* of rear cam profile 748. Plungers 736*a* and 738*a* are each in an extended position as shown to block the sliding movement of pins 726*a* and 732*a*, respectively, within slot 724. In this arrangement, contraction/extension of actuator 734 is configured to cause seat frame 710 to raise/lower relative to base frame 720. This motion may be similar to that described for seat positioning system 200 in the embodiments shown in FIGS. 4J-4L. When forward locking devices 736 are in an unlocked configuration and rear locking devices 738 are in a locked configuration, as shown in FIG. 10C, pins 726*a* are allowed to slide within slot 724 while pins 732*a* are prevented from sliding in slot 724. In some such embodiments, cam element 744 is positioned such that cam follower 740 of forward locking devices 736 is in a lowered position along lowered portion 746*b* of front cam profile 746. Cam element 744 is be positioned such that cam follower 742 of rear locking devices 738 is in a raised position along raised portion 748*b* of rear cam profile 748. Plungers 738*a* of rear locking devices 738 are in an extended position as shown to block the sliding movement of pins 732*a* within slot 724. In this arrangement contraction of actuator 734 causes a rear portion of seat frame 710 to raise higher than a front portion of seat frame 710, resulting in a forward-tilting motion. This motion may be similar to that described for seat positioning system 200 in the embodiments shown in FIGS. 4G-4I. When forward locking devices 736 are in a locked configuration and rear locking devices 738 are in an unlocked configuration, as shown in FIG. 10D, pins 726*a* are prevented from sliding within slot 724 while pins 732*a* are allowed to slide within slot 724. In some such embodiments, cam element 744 is positioned such that cam follower 740 of forward locking devices 736 is in a raised position along first raised portion 746*a* of front cam profile 746. Cam element 744 is also positioned such that cam follower 742 of rear locking devices 738 is in a lowered position along lowered portion 748*a* of rear cam profile 748. Plungers 736*a* of forward locking devices 736 are in an extended position as shown to block the sliding movement of pins 726*a* within slot 724. In this arrangement contraction of actuator 734 causes a front portion of seat frame 710 to raise higher than a rear portion of seat frame 710, resulting in a backward-tilting motion. This motion may be similar to that described for seat positioning system 200 in the embodiments shown in FIGS. 4D-4F.

Figure 9:
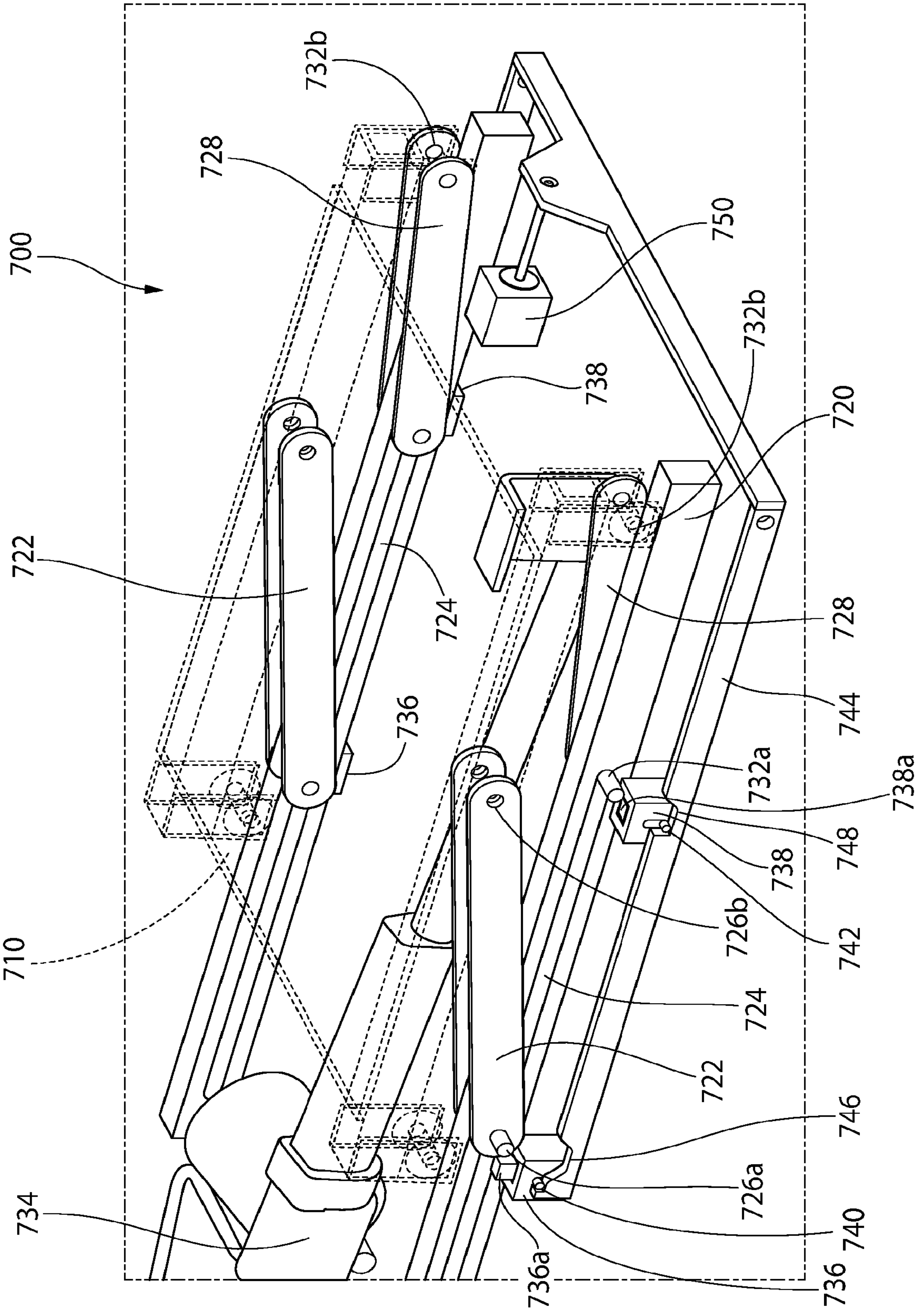
FIG. 9 shows a top perspective view of a seat positioning system in accordance with another embodiment of the present invention.
Figure 10D:
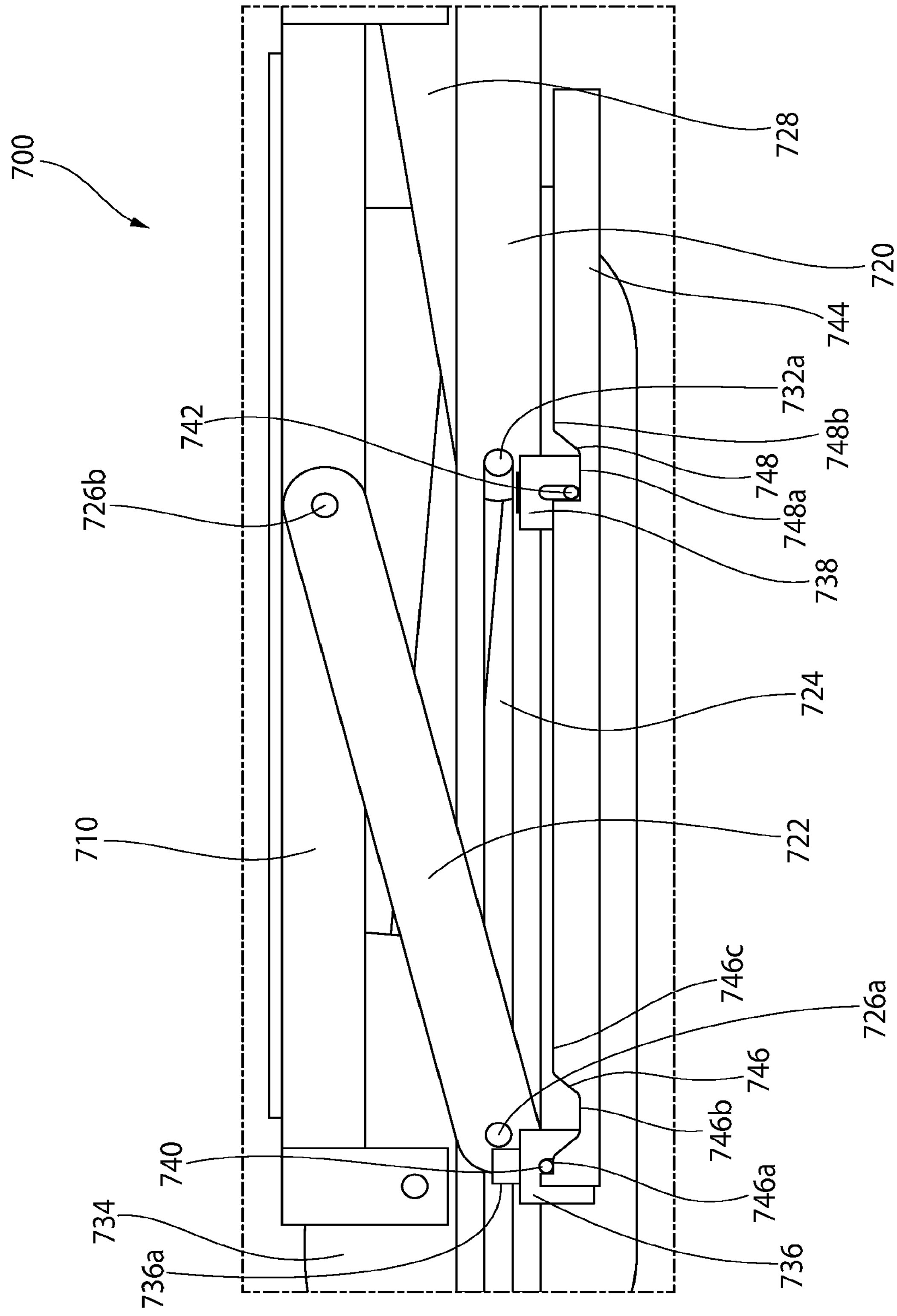
Figure 11:
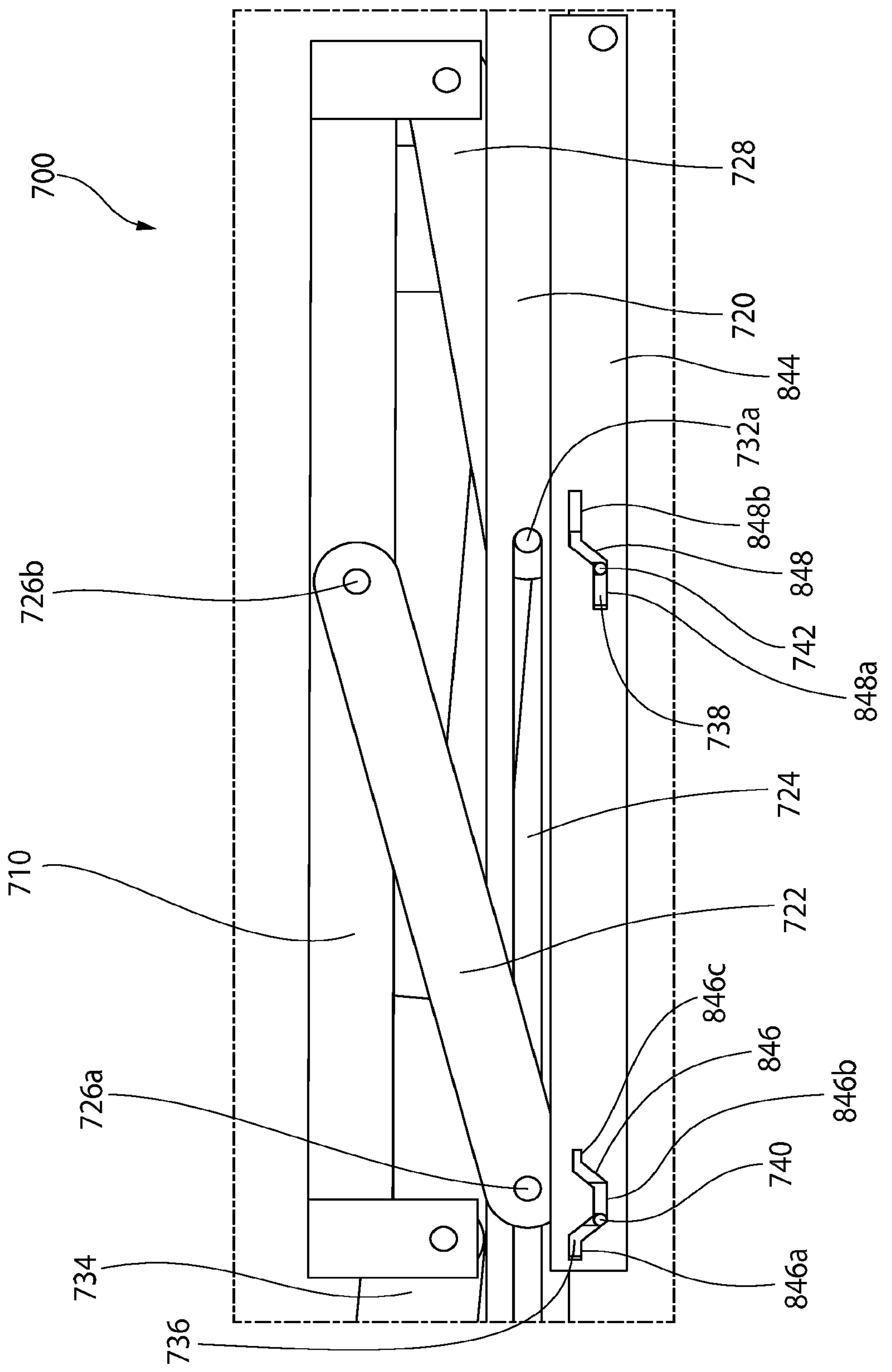
FIG. 11 shows a partial left side view of a seat positioning system in accordance with a further embodiment of the present invention.

FIG. 11 shows a variation of the seat position system 700 shown in FIGS. 9-10D. In this embodiment, a cam element 844 is provided which includes a front cam profile 846 and a rear cam profile 848 that are each configured as slots in which cam followers 740 and 742 are positioned, respectively. As with cam element 744, cam element 844 may be configured to move relative to front and rear locking devices 736 and 738 in a forward-backward direction in order to set the position of cam followers 740 and 742. More particularly, in some embodiments, each of front cam profile 846 and rear cam profile 848 includes at least a raised portion and a lowered portion which are configured to contact and set the position of cam followers 740 and 742 in a manner similar to that described for the embodiments shown in FIGS. 9-10D. As illustrated, in some embodiments front cam profile 846 includes a first raised portion 846*a*, a second raised portion 846*c*, and a lowered portion 846*b* situated between first raised portion 846*a* and second raised portion 846*c*. A sloped or slanted transition portion may be provided immediately between the lowered portion 846*b* and each of the first and second raised portions 846*a* and 846*c*. In some embodiments, as cam element 844 is moved forward/backward relative to forward locking devices 736, cam follower 740 follows the contour of front cam profile 846 and is raised when cam follower 740 is positioned along the first or second raised portions 846*a* and 846*c* or lowered when cam follower 740 is positioned along lowered portion 846*b*. In some embodiments, rear cam profile 846 includes a lowered portion 848*a* and raised portion 848*b*. A sloped or slanted transition portion may be provided immediately between the lowered portion 848*a* and raised portion 848*b*. In some embodiments, as cam element 844 is moved forward/backward relative to rear locking devices 738, cam follower 742 follows the contour of rear cam profile 848 and is raised when cam follower 742 is positioned along raised portion 848*b* or lowered when cam follower 742 is positioned along lowered portion 848*a*. Again, while only the left side of the seat positioning system 700 is visible in FIG. 11, it should be understood that similar or identical front and rear cam profiles 846 and 848 may also be provided on the right side to contact the cam followers 740 and 742 of the forward and rear locking devices 736 and 738 on the right side of the seat positioning system 700.

In some embodiments, the seat positioning systems 100, 200, 500, 600, 700 described above and herein may be particularly useful for supporting a seat used on wheelchairs, for example, powered wheelchairs that are configured to assist people with limited mobility. Such powered wheelchairs may generally include a chassis which supports a seat for an occupant, and further include one or more pairs of drive wheels that are driven by a motor, which may be battery-powered. The powered wheelchairs may also include a control system for adjusting wheelchair speed and direction which is configured to receive input by the wheelchair occupant. Embodiments of seat position systems 100, 200 may be utilized, for example, on powered wheelchairs to adjust the position of the occupant's seat. The seat may be attached to seat frame 110, 210, 510, 610, 710 for this purpose. In some embodiments, the powered wheelchair's control system may be further configured to control the seat's position by actuating actuators 134, 234, 634, 636, 734 and locking/unlocking the forward and rear locking devices 136, 138, 236, 238, 638, 736, 738 to achieve the different positions described above (e.g., forward movement, tilting, and vertical movement). The powered wheelchair's control system may also be configured to control rotation of catch 400 to the unlocked and/or locked configuration described above.

In some embodiments, the powered wheelchair further includes safety features configured to prevent tipping of the wheelchair, maintain wheelchair stability, and/or adjust certain other features (e.g., wheelchair speed, wheel position, turning rate, etc.) depending on the position of the seat positioning system. In some embodiments, a wheelchair may include a control system which is configured to prevent or limit repositioning of the seat positioning system during certain kinds of wheelchair movement (e.g., while traveling above a predetermined speed, while traversing uneven terrain, moving up or down a steep incline, climbing over a curb, etc.) in order to maintain wheelchair stability. Example safety features are disclosed in U.S. Patent Application Publication No. US 2015/0196438 A1. In some embodiments, the safety features may be employed when, for example, the seat is in a forward position, raised position, and/or tilted position.

In some embodiments, the legs rests (not shown) may be configured to curl, automatically and/or by user control, toward the wheelchair when the seat frame 110, 210, 510, 610, 710 is translated forward relative to the base frame 120, 220, 520, 620, 720. Moving the legs rests in may help with clearance (e.g, when sitting at a table) and/or to help keep the center of gravity over the wheelbase to prevent tipping. In one embodiment, the leg rests are configured to move the user's legs to an angle of less than 90 degrees.

While the seat positioning systems of the present invention have been particularly described for use with wheelchairs, embodiments of seat positioning systems 100, 200, 500, 600, 700 may be used for seats in other devices. For example, embodiments of seat positioning systems 100, 200, 500, 600, 700 may also be adapted for positioning seats in other vehicles (tractors, automobiles, airplanes, boats, etc.), armchairs, dental/medical chairs, theater seats, or the like.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps, presently existing or later to be developed that perform substantially the same function or achieve substantially the same result as the corresponding embodiments described herein may be utilized according to the present invention.

What is claimed is:

1. A seat positioning system comprising:

a first frame member;

a second frame member;

a first linkage member coupled to the first frame member and coupled to the second frame member, the first linkage member being slidable relative to the first frame member;

a second linkage member coupled to the first frame member and coupled to the second frame member, the second linkage member being slidable relative to the first frame member;

a first lock having a first unlocked configuration in which the first linkage member is free to slide relative to the first frame member and a first locked configuration in which the first linkage member is prevented from sliding relative to the first frame member; and a second lock having a second unlocked configuration in which the second linkage member is free to slide relative to the first frame member and a second locked configuration in which the second linkage member is prevented from sliding relative to the first frame member, wherein the second frame member is configured to slide in a forward substantially horizontal direction relative to the first frame member when the first lock is in the first unlocked configuration and the second lock is in the second unlocked configuration.

2. The seat positioning system of claim 1 wherein the first lock comprises a first catch and first pin wherein the first catch engages the first pin in the first locked configuration and disengages the first pin in the first unlocked configuration.

3. The seat positioning system of claim 1 wherein the second lock comprises a second catch and second pin wherein the second catch engages the second pin in a second locked configuration and disengages the second pin in a second unlocked configuration.

4. The seat positioning system of claim 1 further comprising:

an actuator configured to tilt the second frame member relative to the first frame member when either the first lock is in the first locked configuration or the second lock is in the second locked configuration.

5. The seat positioning system of claim 4 wherein the actuator is configurated to tilt the second frame member relative to the first frame member in either a forward sloping orientation or a rearward sloping orientation based on whether the first lock is in the first locked configuration or the second lock is in the second locked configuration.

6. The seat positioning system of claim 2 wherein the first catch comprises a first interior radial notch for engaging the first pin in the first locked configuration.

7. The seat positioning system of claim 4 wherein the actuator is extendible to cause the second frame member to tilt relative to the first frame member.

8. The seat position system of claim 4 further comprising a forward end and a rearward end, wherein the second frame member displaces from the first frame member at the rearward end when the second frame member tilts relative to the first frame member.

9. The seat position system of claim 8 wherein the second frame member displaces from the first frame member at the forward end when the second frame member tilts relative to the first frame member.

10. The seat positioning system of claim 4, wherein the actuator is a linear actuator comprising a telescoping body.

11. The seat positioning system of claim 4, wherein the seat positioning system includes only a single actuator configured to move the second frame member relative to the first frame member.

12. The seat positioning system of claim 11, wherein the actuator is configured to move the second frame member while a user occupies a seat coupled to the second frame member.

13. The seat positioning system of claim 5, wherein the forward sloping orientation is configured such that a forward end of the second frame member is positioned closer to the first frame member than a rearward end of the second frame member.

14. The seat positioning system of claim 5, wherein the rearward sloping orientation is configured such that a rearward end of the second frame member is positioned closer to the first frame member than a forward end of the second frame member.

15. A seat positioning system comprising:

a first frame member;

a second frame member;

a first linkage member coupled to the first frame member and coupled to the second frame member, the first linkage member being slidable relative to the first frame member;

a second linkage member coupled to the first frame member and coupled to the second frame member, the second linkage member being slidable relative to the first frame member;

a first lock having a first unlocked configuration in which the first linkage member is free to slide relative to the first frame member and a first locked configuration in which the first linkage member is prevented from sliding relative to the first frame member;

a second lock having a second unlocked configuration in which the second linkage member is free to slide relative to the first frame member and a second locked configuration in which the second linkage member is prevented from sliding relative to the first frame member; and an actuator having a first end pivotally connected to the first frame member and a second end pivotally connected to the second frame member, the actuator configured to transition between an extended state and a retracted state to move the first frame member relative to the second frame member, wherein the second frame member is configured to slide in a forward substantially horizontal direction relative to the first frame member when the first lock is in the first unlocked configuration and the second lock is in the second unlocked configuration.

* * * * *